(12) United States Patent
Saha et al.

(10) Patent No.: US 9,475,901 B2
(45) Date of Patent: Oct. 25, 2016

(54) PHOTOALIGNMENT MATERIALS HAVING IMPROVED ADHESION

(75) Inventors: Gobinda Saha, Pittsburgh, PA (US); Anil Kumar, Murrysville, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 314 days.

(21) Appl. No.: 12/959,467

(22) Filed: Dec. 3, 2010

(65) Prior Publication Data

US 2011/0135850 A1 Jun. 9, 2011

Related U.S. Application Data

(60) Provisional application No. 61/267,604, filed on Dec. 8, 2009.

(51) Int. Cl.
| | |
|---|---|
| *C09K 19/00* | (2006.01) |
| *C08F 220/30* | (2006.01) |
| *C08F 220/62* | (2006.01) |
| *C09K 19/56* | (2006.01) |

(Continued)

(52) U.S. Cl.
CPC .......... *C08F 220/30* (2013.01); *C08F 220/62* (2013.01); *C09K 19/56* (2013.01); *G02B 1/04* (2013.01); *C08F 2220/301* (2013.01); *C08F 2220/303* (2013.01); *C08F 2220/305* (2013.01); *C08F 2220/365* (2013.01); *Y10T 428/1005* (2015.01); *Y10T 428/1014* (2015.01); *Y10T 428/31931* (2015.04)

(58) Field of Classification Search
CPC .. C08F 220/30; C08F 220/62; C08F 220/34; C08F 2220/301; C08F 2220/303; C08F 2220/343; G02F 1/04; C08L 33/10; Y10T 428/1005; Y10T 428/1014
USPC ........ 428/1.2, 1.23; 526/312, 310, 270, 263; 349/599, 588, 589; 252/586, 582; 524/599, 588, 589; 427/553
See application file for complete search history.

(56) References Cited

U.S. PATENT DOCUMENTS

| | | |
|---|---|---|
| 4,556,605 A | 12/1985 | Mogami et al. |
| 4,756,973 A | 7/1988 | Sakagami et al. |
| 5,231,194 A | 7/1993 | Shirafuji et al. |

(Continued)

FOREIGN PATENT DOCUMENTS

| | | |
|---|---|---|
| EP | 1038870 A1 | 9/2000 |
| JP | 798413 A | 4/1995 |

(Continued)

OTHER PUBLICATIONS

Wicks, Blocked Isocyanates, Progress in Organic Coatings, 1975, pp. 73-99, vol. 3.

(Continued)

*Primary Examiner* — Ruiyun Zhang
(74) *Attorney, Agent, or Firm* — The Webb Law Firm

(57) ABSTRACT

The present disclosure provides for new photoalignment (co)polymer materials which demonstrate improved adhesion to a substrate. The (co)polymeric structure includes at least one photochemically active chromophore and at least one adhesion promoter group. Articles of manufacture, optical elements, ophthalmic elements and liquid crystal cells which include at least one photoalignment layer made from the photoalignment (co)polymer materials and methods for formation are also disclosed.

9 Claims, 2 Drawing Sheets

(51) Int. Cl.
*G02B 1/04* (2006.01)
*C08F 220/36* (2006.01)

(56) References Cited

U.S. PATENT DOCUMENTS

| | | | |
|---|---|---|---|
| 5,247,099 A | 9/1993 | Celebuski | |
| 5,300,656 A | 4/1994 | Kuckert et al. | |
| 5,342,970 A | 8/1994 | Chalom et al. | |
| 5,580,819 A | 12/1996 | Li et al. | |
| 5,637,739 A | 6/1997 | Jacobsen et al. | |
| 5,658,501 A | 8/1997 | Kumar et al. | |
| 5,962,617 A | 10/1999 | Slagel | |
| 6,025,026 A | 2/2000 | Smith et al. | |
| 6,042,737 A | 3/2000 | Basil et al. | |
| 6,060,001 A | 5/2000 | Welch et al. | |
| 6,113,814 A | 9/2000 | Gemert et al. | |
| 6,150,430 A | 11/2000 | Walters et al. | |
| 6,187,444 B1 | 2/2001 | Bowles, III et al. | |
| 6,217,948 B1 | 4/2001 | Verrall et al. | |
| 6,268,055 B1 | 7/2001 | Walters et al. | |
| 6,432,544 B1 | 8/2002 | Stewart et al. | |
| 6,433,043 B1 | 8/2002 | Misura et al. | |
| 6,436,525 B1 | 8/2002 | Welch et al. | |
| 6,491,990 B1 * | 12/2002 | Parri et al. | 428/1.1 |
| 6,506,322 B1 | 1/2003 | Breyne et al. | |
| 6,506,488 B1 | 1/2003 | Stewart et al. | |
| 6,531,076 B2 | 3/2003 | Crano et al. | |
| 6,532,076 B1 | 3/2003 | Sidorowich | |
| 6,602,603 B2 | 8/2003 | Welch et al. | |
| 6,641,874 B2 | 11/2003 | Kuntz et al. | |
| 6,719,925 B1 | 4/2004 | Breyne et al. | |
| 7,044,599 B2 | 5/2006 | Kumar et al. | |
| 7,058,249 B2 | 6/2006 | Purchase et al. | |
| 7,097,303 B2 | 8/2006 | Kumar et al. | |
| 7,169,448 B2 | 1/2007 | Coates et al. | |
| 7,173,114 B2 | 2/2007 | Lee et al. | |
| 7,189,456 B2 | 3/2007 | King | |
| RE39,605 E | 5/2007 | Verrall et al. | |
| 7,238,831 B2 | 7/2007 | Wellinghoff et al. | |
| 7,256,921 B2 | 8/2007 | Kumar et al. | |
| 7,261,843 B2 | 8/2007 | Knox et al. | |
| 7,342,112 B2 | 3/2008 | Kumar et al. | |
| 7,410,691 B2 | 8/2008 | Blackburn et al. | |
| 7,452,611 B2 | 11/2008 | Blackburn et al. | |
| 7,556,750 B2 | 7/2009 | Xiao et al. | |
| 7,811,480 B2 | 10/2010 | King | |
| 7,910,019 B2 | 3/2011 | He et al. | |
| 8,003,005 B2 | 8/2011 | He et al. | |
| 2003/0087045 A1 * | 5/2003 | Nakata et al. | 428/1.27 |
| 2003/0165686 A1 | 9/2003 | Blackburn et al. | |
| 2004/0138394 A1 * | 7/2004 | Buchecker et al. | 526/303.1 |
| 2004/0207809 A1 | 10/2004 | Blackburn et al. | |
| 2005/0004361 A1 | 1/2005 | Kumar et al. | |
| 2005/0012998 A1 | 1/2005 | Kumar et al. | |
| 2005/0151926 A1 | 7/2005 | Kumar et al. | |
| 2005/0196616 A1 | 9/2005 | Stewart et al. | |
| 2005/0196617 A1 | 9/2005 | King | |
| 2005/0196618 A1 | 9/2005 | Knox et al. | |
| 2005/0196626 A1 | 9/2005 | Knox et al. | |
| 2005/0196696 A1 | 9/2005 | King | |
| 2006/0051524 A1 * | 3/2006 | Gibbons et al. | 428/1.2 |
| 2006/0226400 A1 | 10/2006 | Xiao et al. | |
| 2007/0026165 A1 * | 2/2007 | Okabe et al. | 428/1.1 |
| 2007/0054131 A1 * | 3/2007 | Stewart | 428/423.1 |
| 2007/0102668 A1 | 5/2007 | Oh et al. | |
| 2009/0146104 A1 | 6/2009 | He et al. | |
| 2009/0281239 A1 | 11/2009 | Hoshino et al. | |
| 2009/0323011 A1 | 12/2009 | He et al. | |
| 2009/0326186 A1 | 12/2009 | He et al. | |
| 2010/0014010 A1 | 1/2010 | He et al. | |
| 2012/0082805 A1 | 4/2012 | Hatanaka et al. | |

FOREIGN PATENT DOCUMENTS

| | | |
|---|---|---|
| JP | 7128522 A | 5/1995 |
| JP | 200786399 A | 4/2007 |
| JP | 2009512903 A | 3/2009 |
| JP | 2009282377 A | 12/2009 |
| WO | 0015629 A1 | 3/2000 |
| WO | 0102449 A2 | 1/2001 |
| WO | 0132661 A1 | 5/2001 |
| WO | 0136406 A1 | 5/2001 |
| WO | WO 2005005573 A1 * | 1/2005 |
| WO | 2008087915 A1 | 7/2008 |
| WO | WO 2009086911 A1 * | 7/2009 |
| WO | 2010150748 A1 | 12/2010 |

OTHER PUBLICATIONS

Creed et al., Photodegradation of Polyimides. 6. Effect of Donor-Acceptor Groups on the Photooxidative Stability of Polyimides and Model Compounds, American Chemical Society: Macromolecules, 1994, pp. 832-837, vol. 27.

Tassel et al., A New Blocking Agent of Isocyanates, European Polymer Journal, 2000, pp. 1745-1751, vol. 36.

Coating Processes, Kirk-Othmer encyclopedia of Chemical Technology, 2004, pp. 1-35, vol. 7, 5th edition.

Takatoh et al., Alignment Technologies and Applications of Liquid Crystal Devices, The Liquid Crystal Book Series, 2005, Taylor & Francis Group, London.

Vretik et al., Polymethacryloylaminoarylmethacrylates: New Concept of Photoalignment Materials for Liquid Crystals, Mol. Cryst. Liq. Cryst., 2007, pp. 121/[1159]-134/[1172], vol. 479.

Huang et al., Synthesis of Photoisomerizable Block Copolymers by Atom Transfer Radical Polymerization, Macromolecular Journals: Macromol. Chem. Phys., 2009, pp. 1484-1492, vol. 210.

* cited by examiner

PHOTOALIGNMENT MATERIALS HAVING IMPROVED ADHESION

CROSS-REFERENCE TO RELATED APPLICATIONS

This application claims the benefit of U.S. Provisional Application Ser. No. 61/267,604, filed Dec. 8, 2009, all of which document is hereby specifically incorporated by reference.

STATEMENT REGARDING FEDERALLY SPONSORED RESEARCH OR DEVELOPMENT

Not applicable.

REFERENCE TO A SEQUENCE LISTING

Not applicable.

BACKGROUND

Various embodiments of the present disclosure new (co)polymeric materials suitable for use as photoalignment layers. The new photoalignment materials comprise a photo-orientable structurally anisotropic polymer network that displays improved adhesion to substrate surfaces and can align thicker monomeric and polymeric liquid crystal layers. Methods of making and applying the new photoalignment materials are also disclosed.

Liquid crystal materials are used in a variety of applications where the liquid crystal material is deposited as a layer on the surface of a substrate. The successful functioning of a liquid crystal device depends, at least in part, on the ability of the liquid crystal molecules within the layer to adopt and maintain a particular alignment or orientation. These liquid crystal layers may be aligned or oriented using various methods. One approach is to coat the surface of the substrate with an orienting layer prior to the application of the liquid crystal layer. The orienting layer may then be used to orient the liquid crystal material on the substrate, for example, by rubbing or irradiation with polarized electromagnetic radiation. The orientation layer defines the direction of orientation of the liquid crystal molecules of the layer with the result that the longitudinal axes of the molecules become aligned with the direction of orientation defined by the orientation layer. In addition to directional alignment, the orientation layer may also impart an angle of tilt to the liquid crystal molecules, so that the molecules align themselves at an angle to the surface of the orientation layer rather than lying parallel to the surface.

Orientation of polymer layers by irradiation with polarized electromagnetic radiation has been known. Irradiation based orientation overcomes certain drawbacks associated with orientation by uniaxial rubbing, such as, for example, dust generation, heat generation, destruction of thin films, and lack of structuring capability. Further, orientation by irradiation also allows for the possibility to provide distinct areas having different orientation relative to neighboring areas. Examples of photo-orientable alignment materials include polymer-bonded photoactive cinnamic acid derivatives, coumarin derivatives, cis/trans isomerizable azo derivatives, and photochemically decomposable polyimide derivatives.

However, even with photoalignment layers with photochemically active alignment chromophores certain problems exist. Typical prior art alignment layer materials used in liquid crystal devices demonstrate poor adhesion, and are produced using high processing temperatures (200° C. to 250° C.) that are not compatible for certain substrates. For example, for certain applications good adhesion to the substrate is necessary. In addition, adhesion between layers in applications where a liquid crystal layer or other layer is deposited on the surface of the photoalignment layer is also necessary. In applications where adhesion levels are not sufficient, peeling of the photoalignment layer from the substrate surface and/or peeling of subsequent layers from the surface of the photoalignment layer may be observed.

In addition, certain applications, such as ophthalmic applications, utilize liquid crystal layers of greater than 20 microns in thickness. In these applications, photoalignment layers that are capable of aligning adherent liquid crystal layers of up to 1,000 microns in thickness are desired. Thus, photoalignment materials that may be used to form layers having improved adhesion properties and thicker aligned liquid crystal layers, relative to known photoalignment materials, are desired.

BRIEF SUMMARY OF THE DISCLOSURE

The present disclosure relates to (co)polymers suitable for use as photoalignment layers in liquid crystal applications.

According to one non-limiting embodiment, the present disclosure provides a (co)polymer comprising a structure represented by Formula I:

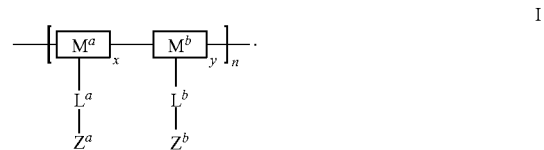

According to the Formulas I (above) and II (below), each $M^a$, $M^b$ and $M^c$ are each independently residues of monomeric units. The residues of the monomer units are described as "unsubstituted" when having the pendant $L^a$, $L^b$, and $L^c$ spacer groups and $Z^a$, $Z^b$, and $Z^c$ groups and "substituted" when further substituents are present as described below. The monomer units $M^a$, $M^b$ and $M^c$ are each independently selected from substituted or unsubstituted acryloyl units, wherein said acryloyl substituents are chosen from $C_1$-$C_4$ alkyl, phenyl, —O— and combinations thereof, substituted or unsubstituted styrene units, substituted or unsubstituted epoxy units, substituted or unsubstituted urethane units, substituted or unsubstituted polycarboxylic acid, substituted or unsubstituted polyol units, substituted or unsubstituted polyamine units, or substituted or unsubstituted hydroxyalkanoic acid units wherein said substituents are chosen from $C_1$-$C_{20}$ alkyl, $C_1$-$C_{20}$ alkoxy, $C_3$-$C_{10}$ cycloalkyl, $C_1$-$C_{20}$ alkyl($C_1$-$C_{20}$)alkoxy, halo($C_1$-$C_{20}$)alkyl, heterocyclo($C_3$-$C_{10}$) alkyl, haloaryl, halo($C_1$-$C_{20}$)alkylaryl, $C_1$-$C_{20}$ alkylaryl, $C_1$-$C_{20}$ alkoxyaryl, heteroaryl, aryl($C_1$-$C_{20}$)alkyl and heteroaryl($C_1$-$C_{20}$)alkyl. Further according to the formulas I and II, $L^a$, $L^b$ and $L^c$ are spacer groups that are each independently selected from the structures set forth in greater detail herein. Each $Z^a$ is independently a photochemically active chromophore selected from a dimerizable substituted or unsubstituted cinnamate or a dimerizable substituted or unsubstituted coumarin, a cis/trans isomerizable substituted or unsubstituted azo, a photochemically decomposable substituted or unsubstituted polyimide, or a substituted or unsubstituted aromatic ester capable of undergoing a photochemical Photo-Fries rearrangement wherein said substituents are selected from $C_1$-$C_{20}$ alkyl, $C_2$-$C_{20}$ alkenyl, $C_2$-$C_{20}$ alkynyl, $C_1$-$C_{20}$ alkoxy, $C_1$-$C_{20}$ alkyl($C_1$-$C_{20}$)alkoxy, $C_1$-$C_{20}$ alkoxy($C_1$-$C_{20}$)alkyl, aryl, heteroaryl, $C_1$-$C_{20}$ alkylamino, di($C_1$-$C_{20}$)alkyl amino, halogen, halo ($C_1$-$C_{20}$)alkyl, $C_3$-$C_{10}$ cycloalkyl, heterocyclo($C_3$-$C_{10}$)alkyl, carboxy, $C_1$-$C_{20}$ alkylcarbonyl, $C_1$-$C_{20}$ alkoxycarbonyl, and aminocarbonyl. Each $Z^b$ is an adhesion promoter group independently selected from hydroxy, carboxylic acid, anhydride, isocyanato, blocked isocyanato, thioisocyanato, blocked thioisocyanato, amino, thio, organofunctional silane, organofunctional titanate, organofunctional zirconate, or epoxy, provided that when $Z^b$ is hydroxy or carboxylic acid, the (co)polymer further comprises at least one other adhesion promoter group. The organofunctional group being selected from vinyl, allyl, vinyl-functional hydrocarbon radicals, epoxy-functional hydrocarbon radicals, allyl-functional hydrocarbon radicals, acryloyl-functional hydrocarbon radicals, methacryloyl-functional hydrocarbon radicals, styryl-functional hydrocarbon radicals, mercapto-functional hydrocarbon radicals or combinations of such organofunctional groups, said hydrocarbon radicals being selected from $C_1$-$C_{20}$ alkyl, $C_2$-$C_{20}$ alkenyl, $C_2$-$C_{20}$ alkynyl, $C_1$-$C_{20}$ alkoxy, $C_1$-$C_{20}$ alkyl($C_1$-$C_{20}$)alkoxy, $C_1$-$C_{20}$)alkoxy ($C_1$-$C_{20}$)alkyl, aryl, heteroaryl, and combinations of such hydrocarbon radicals The variable "x" has a value of $0<x\leq1$, and "y" has a value of $0\leq y<1$, where $x+y=1$ and "n" has a value ranging from 10 to 10,000, wherein when $x=1$, then at least one of $L^a$ and $Z^a$ is further substituted with at least one $Z^b$ adhesion promoter group.

In still other non-limiting embodiments, the present disclosure provides for a (co)polymer comprising a structure represented by Formula II:

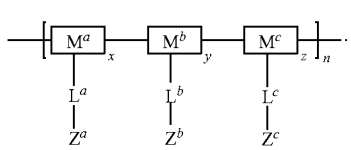

According to the Formula, each $M^a$, $M^b$, and $M^c$ are each independently residues of monomeric units as discussed hereinabove. Further according to the Formula, $L^a$, $L^b$, and $L^c$ are spacer groups that are each independently selected from the structures set forth in greater detail herein. Each $Z^a$ and $Z^b$ is as set forth in greater detail herein. Each $Z^c$ is a mesogen structure selected from a rigid straight rod-like liquid crystal group, a rigid bent rod-like liquid crystal group, or a rigid disc-like liquid crystal group The variable "x" has a value of $0<x\leq1$, "y" has a value of $0\leq y<1$, and "z" has a value of $0\leq z<1$, where $x+y+z=1$ and "n" has a value ranging from 10 to 10,000, wherein when $x=1$, then at least one of $L^a$ and $Z^a$ is further substituted with at least one $Z^b$ adhesion promoter group and when $y=0$, then at least one of $L^a$, $Z^a$, $L^c$ and $Z^c$ is further substituted with at least one $Z^b$ adhesion promoter group. According to one embodiment, the present disclosure provides a (co)polymer wherein z is 0. In another embodiment, the present disclosure provides for a (co)polymer wherein z is greater than 0.

Further non-limiting embodiments of the present disclosure provide for articles of manufacture. The articles of manufacture comprise at least one photoalignable portion comprising a (co)polymer having a structure represented by Formula I or II, wherein the variables $M^a$, $M^b$, $M^c$, $L^a$, $L^b$, $Z^b$, $Z^c$, x, y, z, and n are as described herein.

Still other non-limiting embodiments of the present disclosure provide for optical elements, such as ophthalmic elements, display elements, windows, mirrors, active liquid crystal elements, or passive liquid crystal elements. The optical elements comprise a substrate and a first at least partial layer on at least a portion of a surface of the substrate. The at least partial layer comprises a (co)polymeric material having a structure represented by Formula I or II, wherein the variables $M^a$, $M^b$, $M^c$, $L^a$, $L^b$, $L^c$, $Z^a$, $Z^b$, $Z^c$, x, y, z, and n are as set forth in detail herein. In specific non-limiting embodiments, the optical elements may further comprise one or more additional at least partial layers on at least a portion of the surface of the substrate.

Still further non-limiting embodiments of the present disclosure provide for a liquid crystal cell. The liquid crystal cell comprises a first surface, a second surface opposite the first surface, a first at least partial layer on at least a portion of the first surface facing the second surface, a second at least partial layer on at least a portion of the second surface facing the first surface, where the first at least partial layer and the second at least partial layer define a space, and a liquid crystal material in the space between the first at least partial layer and the second at least partial layer. The first at least partial layer and the second at least partial layer are alignment layers and at least one of the first at least partial layer and the second at least partial layer comprises a (co)polymer having a structure represented by Formula I or II, wherein the variables $M^a$, $M^b$, $M^c$, $L^a$, $L^b$, $L^c$, $Z^a$, $Z^b$, $Z^c$, x, y, z, and n are as set forth in detail herein. In specific embodiments, the liquid crystal material comprises at least one of a dichroic material or a photochromic-dichroic material.

Still other non-limiting embodiments of the present disclosure provide methods of applying a photoalignment material to an optical element. The method comprises applying an at least partial layer of a photoalignment (co)polymer material onto at least a portion of a surface of a substrate, forming an attractive bond between one or more adhesion promoter groups on the photoalignment (co)polymer material and a compatible group on the surface of the substrate, and at least partially aligning at least a first portion of the photoalignment (co)polymer material by exposing the at least partial layer to polarized UV radiation. The photoalignment (co)polymer material has a structure represented by Formula II, wherein the variables $M^a$, $M^b$, $M^c$, $L^a$, $L^b$, $L^c$, $Z^a$, $Z^b$, $Z^c$, x, y, z, and n are as set forth in detail herein.

BRIEF DESCRIPTION OF THE SEVERAL VIEWS OF THE DRAWING(S)

Various non-limiting embodiments disclosed herein will be better understood when read in conjunction with the drawings, in which.

DETAILED DESCRIPTION

Figure 1:
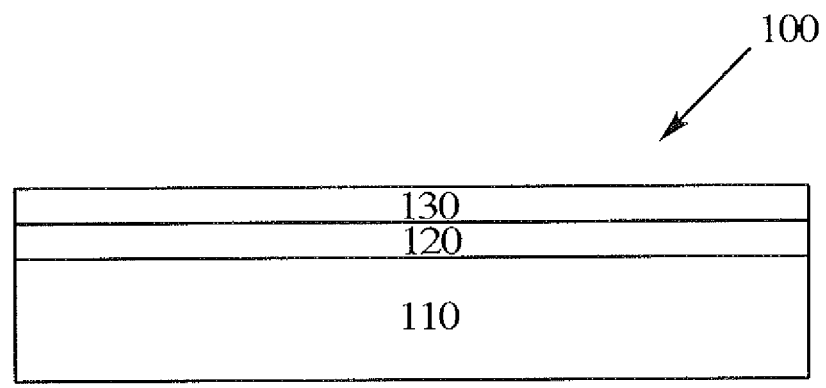
FIG. 1 illustrates one non-limiting embodiment of an optical element according to the present disclosure.

The present disclosure relates to structures and methods for producing new photo-oriented structurally anisotropic polymer networks suitable for deposition as layers on substrates and which can align thicker monomeric and polymeric liquid crystal layers and display improved adherence to commonly used substrates as well as subsequent layers deposited on the surface of the polymer layer.

As used in this specification and the appended claims, the articles "a," "an," and "the" include plural referents unless expressly and unequivocally limited to one referent.

Additionally, for the purposes of this specification, unless otherwise indicated, all numbers expressing quantities of ingredients, reaction conditions, and other properties or parameters used in the specification are to be understood as being modified in all instances by the term "about." Accordingly, unless otherwise indicated, it should be understood that the numerical parameters set forth in the following specification and attached claims are approximations. At the very least, and not as an attempt to limit the application of the doctrine of equivalents to the scope of the claims, numerical parameters should be read in light of the number of reported significant digits and the application of ordinary rounding techniques.

Further, while the numerical ranges and parameters setting forth the broad scope of the invention are approximations as discussed above, the numerical values set forth in the Examples section are reported as precisely as possible. It should be understood, however, that such numerical values inherently contain certain errors resulting from the measurement equipment and/or measurement technique. Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

In the present disclosure and the appended claims, it should be appreciated that where listings of possible structural features, such as, for example substituent groups, are provided herein using headings or subheadings, such as, for example: (a), (b) . . . ; (1), (2) . . . ; (i), (ii) . . . ; etc., these headings or subheadings are provided only for convenience of reading and are not intended to limit or indicate any preference for a particular structural feature or substituent.

The present disclosure describes several different features and aspects of the invention with reference to various exemplary embodiments. It is understood, however, that the invention embraces numerous alternative embodiments, which may be accomplished by combining any of the different features, aspects, and embodiments described herein in any combination that one of ordinary skill in the art would find useful.

Liquid crystal materials are utilized in a variety of applications. The molecules of a liquid crystal ("LC") tend to align with one another in a preferred direction, yielding a fluid material with anisotropic optical, electromagnetic, and/or mechanical properties. The mesogen is the fundamental unit of an LC, which induces the structural order in the liquid crystal material. The mesogenic moiety of the LC typically comprises a rigid moiety which aligns with other mesogenic components in the LC composition, thereby aligning the LC molecules in one specific direction. The rigid portion of the mesogen may consist of a rigid molecular structure, such as a mono- or polycyclic ring structure, including for example, a mono- or polycyclic aromatic ring structure. Liquid crystals mesogens that are suitable for use in conjunction with various non-limiting embodiments disclosed herein include thermotropic liquid crystal mesogens and lyotropic liquid crystal mesogens. Non-limiting examples of thermotropic liquid crystal mesogens that are suitable for use in conjunction with various non-limiting embodiments disclosed herein include columatic (or rod-like) liquid crystal mesogens, discotic (or disc-like) liquid crystal mesogens, and cholesteric liquid crystal mesogens. Non-limiting examples of potential mesogens are set forth in greater detail, for example, in U.S. application Ser. No. 12/163,116, at paragraphs [0024]-[0047]; and include those described in Dennis, et al., "Flüssige Kristalle in Tabellen," VEB Deutscher Verlag Für Grundstoffindustrie, Leipzig, Germany, 1974 and "Flüssige Kristalle in Tabellen II," VEB Deutscher Verlag Für Grundstoffindustrie, Leipzig, Germany, 1984, the disclosures of each of which are incorporated by reference herein.

LCs may exist in a non-ordered state or an ordered (aligned) state. The LC molecules in the non-ordered state will adopt an essentially random orientation, that is, there will be no general orientation to the LC molecules. The LC molecules in an ordered or aligned state will generally adopt an orientation where the mesogenic portions of the LC molecules are at least partially aligned throughout the aligned portion of the LC material. As used herein, the terms "align" or "aligned" mean to bring into suitable arrangement or position by interaction with another material, compound or structure. In certain cases, the mesogenic portions of the LC molecules will be at least partially aligned in a parallel orientation. In other cases, the mesogenic portions of the LC molecules may be at least partially aligned in a helical orientation.

Liquid crystal polymers ("LCPs") are polymers capable of forming regions of highly ordered structure while in a liquid phase. LCPs may be made from liquid crystal monomer ("LCMs") compounds that are then polymerized to form the LCP. Alternatively, LCPs may be formed by polymerizing a polymerizable material in the presence of a liquid crystal material, such that the liquid crystal material in entrapped in the polymer. LCs, LCMs, and LCPs have a wide range of uses, ranging from use as strong engineering plastics to delicate gels for LC displays. These materials may also be used, for example, in optical elements, such as, but not limited to, ophthalmic elements, display elements, windows, and mirrors. Liquid crystal materials may be used, for example, as at least partial layers, coatings, or films on at least a portion of a substrate and may impart certain desired characteristics to the substrate, such as, for use in optical data storage applications as photomasks or decorative pigments; in cosmetics and for security applications (see, for example, U.S. Pat. No. 6,217,948, which is incorporated by reference herein); as curable resins for medical, dental, adhesive and stereolithographic applications (see, for example, U.S. Pat. No. 7,238,831, which is incorporated by reference herein); as articles of manufacture, such as, molded assemble, or cast articles for use in the aforementioned applications and various related devices. In certain cases, the LC materials may be incorporated into optical elements, such as, for example, ophthalmic elements, display elements, windows, mirrors, active and passive liquid crystal cells, elements, and devices and other LC or LCP containing articles of interest, such as, but not limited to, polarizers, optical compensators (see, for example, U.S. Pat. No. 7,169,448, which is incorporated by reference herein), optical retarders (see, for example, U.S. Pat. No. RE39,605E, which is incorporated by reference herein), color filters, and waveplates for lightwave circuits (see, for example, U.S. Pat. No. 7,058,249, which is incorporated by reference herein). Certain mesogenic compounds may find particular use as LCMs and LCPs for the formation of ophthalmic elements which further comprise a dichroic or photochromic-dichroic material or compound. Dichroic compounds are capable of preferentially absorbing one of two orthogonal components of plane polarized light.

It is generally necessary to suitably position or arrange the mesogenic or LC molecules, including, for example, dichroic compounds, in order to achieve the desired effect. That is, for rod-like or linear mesogens, it is generally necessary to at least partially align the molecules of the compound such that the long axes of the at least partially aligned molecules of the mesogenic compound are generally parallel to each other. At least partial alignment of LC materials or other anisotropic materials may be effected by at least one of exposing the at least a portion of the material to a magnetic field, exposing the at least a portion of the material to a shear force, exposing the at least a portion of the material to an electric field, exposing the at least a portion of the material to plane-polarized ultraviolet (UV) radiation, exposing the at least a portion of the material to infrared radiation, drying the at least a portion of the material, etching the at least a portion of the material, rubbing the at least a portion of the material, and aligning the at least a portion of the material with another structure or material, such as, but not limited to, an at least partially ordered alignment material. It is also possible to align the LC materials or other anisotropic material with an oriented surface, such as a surface coated with an at least partially ordered alignment material. That is, liquid crystal molecules can be applied as a coating, layer, or film to a surface that has been oriented, for example by rubbing, grooving, or photo-alignment methods, and subsequently aligned such that the long axis of each of the liquid crystal molecules takes on an orientation that is generally parallel to the general direction of orientation of the surface.

Alignment materials, such as photoalignment material, may be used as a coating on a surface of a substrate or a portion of the surface where the alignment material may be at least partially aligned and then may then be used to align one or more liquid crystal material in a subsequent layer that is applied on a portion of the alignment material layer. However, conventional photoalignment materials may display unsatisfactory adhesion to the surface and/or subsequent layers that may be coated on the surface of the photoalignment materials. This may lead to peeling or detaching of the photoalignment layer from the surface and/or subsequent layers and overall loss in product utility and lifetime. The various non-limiting embodiments of the present disclosure provide for new (co)polymeric photoalignment materials. The (co)polymeric photoalignment materials display improved adhesion to a surface of a substrate onto which the materials are coated and improved adhesion between the materials and a subsequent layer that is deposited on the surface of the photoalignment materials layer. Improved adhesion characteristics are affected by the incorporation of an adhesion promoter group within the (co)polymeric structure of the photoalignment material.

According to one non-limiting embodiment, the present disclosure provides a (co)polymer comprising a structure represented by Formula I.

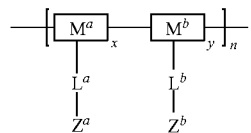

(I)

Referring to Formula I, $M^a$ and $M^b$ represent residues of monomeric units. Each $M^a$ and $M^b$ are selected from substituted or unsubstituted acryloyl units, wherein said acryloyl substituents are chosen from $C_1$-$C_4$ alkyl, phenyl, —O— and combinations thereof. Examples of such acryloyl units include acryloyloxy, methacryloyloxy and cinnamate. Each $M^a$ and $M^b$ are also selected from substituted or unsubstituted styrene units, substituted or unsubstituted epoxy units, substituted or unsubstituted urethane units, substituted or unsubstituted polycarboxylic acid, substituted or unsubstituted polyol units, substituted or unsubstituted polyamine units, or substituted or unsubstituted hydroxyalkanoic acid units wherein said substituents are chosen from $C_1$-$C_{20}$ alkyl, $C_1$-$C_{20}$ alkoxy, $C_3$-$C_{10}$ cycloalkyl, $C_1$-$C_{20}$ alkyl($C_1$-$C_{20}$)alkoxy, halo($C_1$-$C_{20}$)alkyl, heterocyclo($C_3$-$C_{10}$)alkyl, haloaryl, halo($C_1$-$C_{20}$)alkylaryl, $C_1$-$C_{20}$ alkylaryl, $C_1$-$C_{20}$ alkoxyaryl, heteroaryl, aryl($C_1$-$C_{20}$)alkyl and heteroaryl($C_1$-$C_{20}$)alkyl. As used herein, the term "residues" when used in reference to a monomer or monomeric unit means that which remains of the monomeric unit after it has been incorporated into a polymer chain. As used herein, the term "derivative" when used in reference to a carboxylic acid or polycarboxylic acid includes amides, esters, acyl halides, acyl anhydrides, and cyano derivatives. The $M^a$ and $M^b$ groups in Formula I make up the polymer main chain of the (co)polymer. According to specific non-limiting embodiments, the $M^a$ and $M^b$ groups may each independently be residues of substituted or unsubstituted acryloyloxy units or substituted or unsubstituted methacryloyloxy units.

As represented by Formula I, the (co)polymer has pendant groups -$L^a$-$Z^a$ and -$L^b$-$Z^b$, where the L groups represent spacer groups between the monomeric residue (i.e., $M^a$ and $M^b$) and the $Z^a$ and $Z^b$ groups. According to various non-limiting embodiments, the $L^a$ and $L^b$ groups are spacer groups that may each independently selected from a single bond, —(CH$_2$)$_g$—, —(CF$_2$)$_h$—, —Si(Z')$_2$(CH$_2$)$_g$—, or —(Si(CH$_3$)$_2$O)$_h$—, —N(R)—, —C(R)=C(R)—, —C(R)=N—, —C(R')$_2$—C(R')$_2$—, —O—, —C(O)—, —C≡C—, —N=N—, —S—, —S(O)—, —S(O)(O)—, —(O)S(O)O—, —O(O)S(O)O—, straight-chain or branched $C_1$-$C_{24}$ alkylene residue, arylene, $C_3$-$C_{10}$ cycloalkylene, or various combinations thereof. According to these structures, Z' may be independently chosen for each occurrence from hydrogen, $C_1$-$C_{18}$ alkyl, $C_3$-$C_{10}$ cycloalkyl or aryl; R may be independently chosen for each occurrence from $Z^b$, hydrogen, $C_1$-$C_{18}$ alkyl, $C_3$-$C_{10}$ cycloalkyl or aryl; R' may independently chosen for each occurrence from $Z^b$, $C_1$-$C_{18}$ alkyl, $C_3$-$C_{10}$ cycloalkyl or aryl; the $C_1$-$C_{24}$ alkylene residue may be mono-substituted by $Z^b$, cyano, or halo, or poly-substituted by $Z^b$ or halo. Further, according to the spacer groups $L^a$ and $L^b$, "g" may be independently chosen for each occurrence from 1 to 20, for example, from 2 to 15 or from 5 to 10; and "h" may be represented by a whole number from 1 to 16 inclusive, for example, from 2 to 12 or from 4 to 10.

Each $Z^a$ group represents a photochemically active chromophore. As used herein, the phrase "photochemically active chromophore" includes structures or portions of the molecule or polymer which chemically react (such as with themselves or with another active moiety, for example another photochemically active chromophore) upon the absorption of actinic radiation. As used herein, the term "actinic radiation" means electromagnetic radiation that is capable of causing a response. Actinic radiation includes, for example and without limitation, visible and ultraviolet radiation. The photochemically active chromophore may undergo a photochemical cis/trans-isomerization, a photochemical

[2+2] cycloaddition (leading to a cross-linking of the polymer or oligomer), a photochemical decomposition or a photochemical rearrangement. According to various non-limiting embodiments, suitable photochemically active chromophores include, but are not limited to, dimerizable substituted or unsubstituted cinnamate or dimerizable dimerizable coumarin, cis/trans isomerizable substituted or unsubstituted azo, photochemically decomposable polyimide, and photochemically rearrangeable substituted or unsubstituted aromatic esters, such as those that can undergo a Photo-Fries rearrangement. In specific non-limiting embodiments, the photochemically active chromophore may be a dimerizable substituted or unsubstituted cinnamate or a dimerizable substituted or unsubstituted coumarin. Cinnamates and coumarins may react upon exposure to actinic radiation to undergo a [2+2] dimerization as described in "Alignment Technologies and Applications of Liquid Crystal Devices," Kohki Takotah et al., Taylor and Francis, New York, 2005, pages 61-63, which disclosure is incorporated herein by this reference. Non-limiting examples of suitable cinnamates may be found in U.S. Pat. No. 5,637,739 at column 6, lines 19 to 32 and U.S. Pat. No. 7,173,114 at column 3, line 13 to column 5, line 2 and coumarins may be found in U.S. Pat. No. 5,231,194 at column 1, line 37 to column 3, line 50; U.S. Pat. No. 5,247,099 at column 1, line 66 to column 4 line 28; U.S. Pat. No. 5,300,656 at column 1, line 13 to column 10, line 15; and U.S. Pat. No. 5,342,970 at column 1, line 6 to column 7, line 34, the disclosures of each of which are incorporated herein by reference.

Further examples of photochemically active chromophores include: a photoisomerizable azo compound such as Poly((n-butyl methacrylate-co-(E)-4-(phenyldiazenyl) phenyl methacrylate)-b-styrene) described in Macromol. Chem. Phys. 2009, 210, pages 1484-1492; photodegradable polyimides such as Poly(2-methyl-6-(4-(p-tolyloxy)phenyl) pyrrolo[3,4-f]isoindole-1,3,5,7(2H,6H)-tetraone), Poly(5-(2-(1,3-dioxo-2-(4-(p-tolyloxy)phenyl)isoindolin-5-yl)-1,1, 1,3,3,3-hexafluoropropan-2-yl)-2-methylisoindoline-1,3-dione), Poly(5-(2-(1,3-dioxo-2-(4-(2-(p-tolyl)propan-2-yl) phenyl)isoindolin-5-yl)-1,1,1,3,3,3-hexafluoropropan-2-yl)-2-methylisoindoline-1,3-dione); and Poly(5-(1,1,1,3,3,3-hexafluoro-2-(2-(4-(1,1,1,3,3,3-hexafluoro-2-(p-tolyl) propan-2-yl)phenyl)-1,3-dioxoisoindolin-5-yl)propan-2-yl)-2-methylisoindoline-1,3-dione) described in Macromolecules 1994, 27, pages 832-837; a photoreactive polyimide such as (2E,2'E)-4-(5-(1,1,1,3,3,3-hexafluoro-2-(2-methyl-1,3-dioxoisoindolin-5-yl)propan-2-yl)-1,3-dioxoisoindolin-2-yl)-4'-methyl-[1,1'-biphenyl]-3,3'-diyl bis(3-phenylacrylate) described in Macromolecules 2003, 36, pages 6527-6536; a photodecomposable polyimide such as 7-methyl-2-(4-(4-methylbenzyl)phenyl)tetrahydro-1H-5,9-methanopyrido[3,4-d]azepine-1,3,6,8(2H,4H,7H)-tetraone and 2-methyl-5-(4-(4-(2-(4-(p-tolyloxy)phenyl)propan-2-yl)phenoxy)phenyl)hexahydrocyclobuta[1,2-c:3,4-c']dipyrrole-13 (2H,3 aH)-dione described in the *The Liquid Crystal Book Series: Alignment Technologies and Application of Liquid Crystal Devices*, by K. Takatoh et. al., 2005, Taylor and Francis, page 63; and aromatic esters capable of undergoing a Photo-Fries rearrangement include: Poly(5-methacrylamidonaphthalen-1-yl methacrylate); Poly(4-methacrylamidonaphthalen-1-yl methacrylate); Poly(4-methacrylamidophenyl methacrylate); Poly(4-methacrylamidophenethyl methacrylate); and Poly(4-(2-methacrylamidoethyl)phenyl methacrylate) described in Molecular Crystal and Liquid Crystal, 2007, Vol. 479 page 121. The disclosures of each of the aforementioned articles and text related to photochemically active chromophores are incorporated herein by reference.

Each $Z^b$ group represents an adhesion promoter group. As used herein, the term "adhesion promoter" means a group or structure that improves adhesion between the (co)polymeric structure and the substrate to which it is coated onto or to polymeric films that are coated onto the surface of the polymer containing the adhesion promoter. Adhesion promoters may act by forming an at least partial attractive force on a molecular or atomic level between the (co)polymer and the substrate or subsequent coating. Examples of attractive forces include covalent bonds, polar covalent bonds, ionic bonds, hydrogen bonds, electrostatic attractions, hydrophobic interactions, and van der Waals attractions. That is, a functionality on the adhesion promoter group $Z^b$ can form an attractive interaction with a functionality on the surface or a functionality on the subsequent coating. Within the structure of the copolymer according to the various non-limiting embodiments herein, the attractive interaction between a plurality of adhesion promoter groups $Z^b$ and the substrate surface or subsequent coating material results in an improved adhesion between the copolymer and the substrate surface and/or the subsequent coating. Various non-limiting embodiments of suitable structures for adhesion promoter group $Z^b$ include hydroxy, carboxylic acid, anhydride, isocyanato, blocked isocyanato, thioisocyanato, blocked thioisocyanato, amino, thio, organofunctional silane, organofunctional titanate, organofunctional zirconate, and epoxy, wherein each organofunctional group is independently selected from vinyl, allyl, vinyl-functional hydrocarbon radicals, epoxy-functional hydrocarbon radicals, allyl-functional hydrocarbon radicals, acryloyl-functional hydrocarbon radicals, methacryloyl-functional hydrocarbon radicals, styryl-functional hydrocarbon radicals, mercapto-functional hydrocarbon radicals or combinations of such organofunctional groups, said hydrocarbon radicals being selected from $C_1$-$C_{20}$ alkyl, $C_2$-$C_{20}$ alkenyl, $C_2$-$C_{20}$ alkynyl, $C_1$-$C_{20}$ alkoxy, $C_1$-$C_{20}$ alkyl($C_1$-$C_{20}$)alkoxy, $C_1$-$C_{20}$ alkoxy($C_1$-$C_{20}$) alkyl, aryl, heteroaryl, and combinations of such hydrocarbon radicals; provided that when $Z^b$ is hydroxy or carboxylic acid, the (co)polymer further comprises at least one other adhesion promoter group; such as, but not limited to those promoters disclosed in U.S. Pat. No. 6,025,026 at column 6, line 5 to column 8, line 65; U.S. Pat. No. 6,150,430 at column 2, line 59 to column 5, line 44; and U.S. Pat. No. 7,410,691 at column 6, line 4 to column 8, line 19; which disclosures are incorporated herein by reference. As used herein, the term "blocked" when used in reference to isocyanato or thioisocyanato groups refers to a structure where the isocyanato or thioisocyanato group has been reversibly reacted with a group to protect the isocyanato or thioisocyanato group from reacting until the blocking group is removed. Generally, compounds used to block isocyanato or thioisocyanato groups may be organic compounds that have active hydrogen atoms, for example, but not limited to, volatile alcohols, epsilon-caprolactam or ketoxime compounds. Non-limiting examples of blocking groups include amines, hydrooxamic esters, substituted or unsubstituted pyrazol groups, phenols, cresol, nonylphenol, caprolactam, triazole, imidazoline, oxime, formate and diacetone, including those described in X. Tassel et al., "A New Blocking Agent of Isocyanates" *European Polymer Journal*, 2000, 36, 1745-1751 and Z. W. Wicks Jr., *Progress in Organic Coatings*, 1975, 3, 73-99, which disclosures are incorporated herein by this reference.

Referring still to Formula I, according to various non-limiting embodiments, "n" may have a value ranging from 10 to 10,000, for example from 100 to 5,000 or from 500 to 2,000. According to specific non-limiting embodiments, "x" may have a value of $0<x\leq 1$ and "y" may have a value of $0\leq y<1$, where x+y=1. That is, according to these specific non-limiting embodiments, the (co)polymer contains only $M^a$ and $M^b$ monomer residues. In other non-limiting embodiments, such as described herein, the (co)polymer may comprise additional monomer residues. In those non-limiting embodiments where x=1 (i.e., when y=0), then at least one of $L^a$ and $Z^a$ is further substituted with at least one $Z^b$ adhesion promoter group.

In still other non-limiting embodiments of the (co)polymer described herein, the copolymer structure represented by Formula I may further comprise residues of a substituted monomeric unit $M^c$ having the structure:

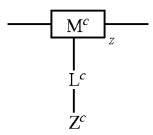

where each $M^c$ may independently be a residue of monomeric unties selected from substituted or unsubstituted acryloyl units, wherein said acryloyl substituents are chosen from $C_1$-$C_4$ alkyl, phenyl, —O— and combinations thereof, substituted or unsubstituted styrene units, substituted or unsubstituted epoxy units, substituted or unsubstituted urethane units, substituted or unsubstituted polycarboxylic acid units, substituted or unsubstituted polyol units, substituted or unsubstituted polyamine units, or substituted or unsubstituted hydroxyalkanoic acid units; wherein said substituents are selected from $C_1$-$C_{20}$ alkyl, $C_1$-$C_{20}$ alkoxy, $C_3$-$C_{10}$ cycloalkyl, $C_1$-$C_{20}$ alkyl($C_1$-$C_{20}$)alkoxy, halo($C_1$-$C_{20}$)alkyl, heterocyclo($C_3$-$C_{10}$)alkyl, haloaryl, halo($C_1$-$C_{20}$)alkylaryl, $C_1$-$C_{20}$ alkylaryl, $C_1$-$C_{20}$ alkoxyaryl, heteroaryl, aryl($C_1$-$C_{20}$)alkyl, heteroaryl($C_1$-$C_{20}$)alkyl. Each $L^c$ is a spacer group that may be independently be chosen from those spacer groups described herein. According to various non-limiting embodiments, the group $Z^c$ is a mesogen structure that may be selected from a rigid straight rod-like liquid crystal group, a rigid bent rod-like liquid crystal group, or a rigid disc-like liquid crystal group. According to these non-limiting embodiments, "z" may have a value of $0<z<1$ such that x+y+z=1. That is, the copolymer may consist of residues of monomeric structures represented by $M^a$, $M^b$ and $M^c$. In those non-limiting embodiments, where y=0, then at least one of $L^a$, $Z^a$, $L^c$, and $Z^c$ is further substituted with at least one $Z^b$ adhesion promoter group. That is in all embodiments of the copolymer, the monomeric residues of the copolymer will have substituents having at least one $Z^b$ adhesion promoter group.

Still other non-limiting embodiments of the present disclosure provide for a (co)polymer comprising a structure represented by Formula II:

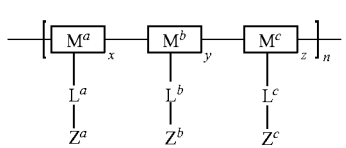

(II)

wherein the groups $M^a$, $M^b$, $M^c$, $L^a$, $L^b$, $L^c$, $Z^a$, $Z^b$, and $Z^c$ have structures as set forth herein. The value of "n" ranges from 10 to 10,000, for example from 100 to 5,000 or from 500 to 2,000. According to Formula II, "x" may have a value of $0<x\leq 1$; "y" may have a value of $0\leq y<1$; and "z" may have a value of $0\leq z<1$ where x+y+z=1, provided that when x=1 then at least one of $L^a$ and $Z^a$ is further substituted with at least one $Z^b$ adhesion promoter group and when y=0, then at least one of $L^a$, $Z^a$, $L^c$, and $Z^c$ is further substituted with at least one $Z^b$ adhesion promoter group. According to one embodiment, the present disclosure provides a (co)polymer wherein z is 0. In another embodiment, the present disclosure provides for a (co)polymer wherein z is greater than 0.

In specific non-limiting embodiments, $M^a$, $M^b$, and $M^c$ may each independently be residues of substituted or unsubstituted acryloyloxy units or substituted or unsubstituted methacryloyloxy units and $Z^a$ may be a photochemically active chromophore selected from a dimerizable substituted or unsubstituted cinnamate or a dimerizable substituted or unsubstituted coumarin.

According to the various non-limiting embodiments of the (co)polymers described herein, the $Z^c$ mesogen structure may have a structure represented by:

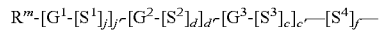

According to the $Z^c$ mesogen structure, each $G^1$, $G^2$, and $G^3$ may independently be chosen for each occurrence from a divalent group chosen from an unsubstituted or a substituted aromatic group, an unsubstituted or a substituted alicyclic group, an unsubstituted or a substituted heterocyclic group, and mixtures thereof, wherein substituents are chosen from: hydroxy; amino; halogen; $C_2$-$C_{18}$ alkenyl; $C_2$-$C_{18}$ alkynyl; azido; silyl; siloxy; silylhydride; (tetrahydro-2H-pyran-2-yl) oxy; thio; isocyanato; thioisocyanato; acryloyloxy; methacryloyloxy; 2-(acryloyloxy)ethylcarbamyl; 2-(methacryloyloxy)ethylcarbamyl; aziridinyl; allyloxycarbonyloxy; epoxy; carboxylic acid; carboxylic ester; acryloylamino; methacryloylamino; aminocarbonyl; $C_1$-$C_{18}$ alkyl aminocarbonyl; aminocarbonyl($C_1$-$C_{18}$)alkyl; $C_1$-$C_{18}$ alkoxycarbonyl; $C_1$-$C_{18}$ alkylcarbonyl; aryloxycarbonyloxy; perfluoro($C_1$-$C_{18}$)alkylamino; di-(perfluoro($C_1$-$C_{18}$)alkyl)amino; $C_1$-$C_{18}$ acetyl; $C_3$-$C_{10}$ cycloalkyl; $C_3$-$C_{10}$ cycloalkoxy; $C_1$-$C_{18}$ alkyloxycarbonyloxy; halocarbonyl; hydrogen; aryl; hydroxy($C_1$-$C_{18}$)alkyl; $C_1$-$C_{18}$ alkyl; $C_1$-$C_{18}$ alkoxy; amino($C_1$-$C_{18}$)alkyl; $C_1$-$C_{18}$ alkylamino; di-($C_1$-$C_{18}$)alkylamino; $C_1$-$C_{18}$ alkyl($C_1$-$C_{18}$)alkoxy; $C_1$-$C_{18}$ alkoxy($C_1$-$C_{18}$)alkoxy; nitro; poly($C_1$-$C_{18}$)alkyl ether; ($C_1$-$C_{18}$)alkyl($C_1$-$C_{18}$)alkoxy($C_1$-$C_{18}$)alkyl; poly($C_1$-$C_{18}$)alkoxy; ethylene; acryloyloxy($C_1$-$C_{18}$)alkyl; methacryloxyloxy($C_1$-$C_{18}$)alkyl; 2-chloroacryloyloxy; 2-phenylacryloyloxy; acryloyloxyphenyl; 2-chloroacryloylamino; 2-phenylacryloylaminocarbonyl; oxtanyl; glycidyl; cyano; isocyanato($C_1$-$C_{18}$)alkyl; itaconic acid ester; vinyl ether; vinyl ester; a styrene derivative; main-chain or side-chain liquid crystal polymers; siloxane derivatives; ethyleneimine derivatives; maleic acid derivatives; fumaric acid derivatives; a straight-chain or branched $C_1$-$C_{18}$ alkyl group that is mono-substituted with cyano, halo, or $C_1$-$C_{18}$ alkoxy, or poly-substituted with halo; unsubstituted cinnamic acid derivatives; cinnamic acid derivatives that are substituted with at least one of methyl, methoxy, cyano, or halogen; substituted or unsubstituted chiral or non-chiral monovalent or divalent groups chosen from steroid radicals, terpenoid radicals, alkaloid radicals, or mixtures thereof, wherein the substituents are independently chosen from $C_1$-$C_{18}$ alkyl, $C_1$-$C_{18}$ alkoxy, amino, $C_3$-$C_{10}$ cycloalkyl, $C_1$-$C_{18}$ alkyl($C_1$-$C_{18}$)alkoxy, fluoro($C_1$-$C_{18}$) alkyl, cyano, cyano($C_1$-$C_{18}$)alkyl, cyano($C_1$-$C_{18}$)alkoxy, or mixtures thereof; or a group comprising one of the following formulae: -M(T)$_{(t-1)}$ and -M(OT)$_{(t-1)}$, wherein M is chosen from aluminum, antimony, tantalum, titanium, zirconium and silicon, T is chosen from organofunctional radicals, organofunctional hydrocarbon radicals, aliphatic hydrocarbon radicals and aromatic hydrocarbon radicals, and "t" is the valence of M. Referring still to mesogen structure $Z^c$, $R'''$ may be H, hydroxy, amino, halogen, haloalkyl, aryl, $C_1$-$C_{18}$ alkyl, or $C_1$-$C_{18}$ alkoxy. Further, the variables "j'", "d'", "e'", and "f'" may each independently have a value chosen from an integer ranging from 0 to 20, inclusive and "j'", "d'" and "e'" may each independently be an integer from 0 to 4, provided that a sum of j'+d'+e' is at least 1. Referring still to the $Z^c$ mesogen structure, each $S^1$, $S^2$, $S^3$, and $S^4$ are spacer units which may independently be chosen for each occurrence from a spacer unit chosen from: (a) —(CH$_2$)$_g$—, —(CF$_2$)$_h$—, —Si(Z')$_2$(CH$_2$)$_g$—, or —(Si(CH$_3$)$_2$O)$_h$—, wherein Z' is independently chosen for each occurrence from hydrogen, $C_1$-$C_{18}$ alkyl, $C_3$-$C_{10}$ cycloalkyl or aryl; "g" is independently chosen for each occurrence from 1 to 20 and "h" is a whole number from 1 to 16 inclusive; (b) —N(Y)—, —C(Y)=C(Y)—, —C(Y)=N—, —C(Y')$_2$—C(Y')$_2$—, or a single bond, wherein each Y is independently chosen for each occurrence from hydrogen, $C_1$-$C_{18}$ alkyl, $C_3$-$C_{10}$ cycloalkyl and aryl, and each Y' is independently chosen for each occurrence from $C_1$-$C_{18}$ alkyl, $C_3$-$C_{10}$ cycloalkyl and aryl; or (c) —O—, —C(O)—, —C≡N—, —N=N—, —S—, —S(O)—, —S(O)(O)—, —(O)S(O)O—, —O(O)S(O)O—, arylene, $C_3$-$C_{10}$ cycloalkylene, or straight-chain or branched $C_1$-$C_{24}$ alkylene residue, said $C_1$-$C_{24}$ alkylene residue being unsubstituted, mono-substituted by cyano or halo, or poly-substituted by halo; provided that when two spacer units comprising heteroatoms are linked together the spacer units are linked so that heteroatoms are not directly linked to each other and when $S^1$ and $S^4$ are linked to another group, they are linked so that two heteroatoms are not directly linked to each other.

Non-limiting examples of other suitable structures for mesogen $Z^c$ may be found, for example, in U.S. application Ser. No. 12/489,811, at paragraphs [0018]-[0040]; and include those described in Demus, et al., "Flüssige Kristalle in Tabellen," VEB Deutscher Verlag Für Grundstoffindustrie, Leipzig, Germany, 1974 and "Flüssige Kristalle in Tabellen II," VEB Deutscher Verlag Für Grundstoffindustrie, Leipzig, Germany, 1984; the disclosures of each of which are incorporated herein by reference. One skilled in the art based on the present disclosure will understand how to incorporate the mesogen structures set forth in these references into the structure of the monomeric unit $M^c$.

The (co)polymers according to the various non-limiting embodiments herein may have a polymeric form of a random copolymer, a block copolymer, a graft copolymer, a linear copolymer, a branched copolymer, a hyperbranched copolymer, a dendritic copolymer, or a star copolymer. In specific non-limiting embodiments, the (co)polymers may include a polymer chain where different sections may have different forms, such as, for example, a random polymeric section and a block polymeric section. Formation of (co)polymers having one or more of the recited forms may be accomplished using polymerization methods known in the art, including, but not limited to, addition polymerization, condensation polymerization, controlled "living" polymerization, anionic polymerization, cationic polymerization, and radical polymerization.

The (co)polymers of the various non-limiting embodiments described herein may further comprise a residue of at least one of a photochromic compound, a dichroic compound, a photochromic-dichroic compound, a photosensitive material, and a non-photosensitive material. The (co)polymers described herein may be in a composition further comprising one or more additives. The additives may be selected from the group consisting of a photochromic compound, a dichroic compound, a photochromic-dichroic compound, a photosensitive material, a liquid crystal, a liquid crystal property control additive, a non-linear optical material, a dye, an alignment promoter, a kinetic enhancer, a photoinitiator, a thermal initiator, a surfactant, a polymerization inhibitor, a solvent, a light stabilizer, a thermal stabilizer, a mold release agent, a rheology control agent, a gelator, a leveling agent, a free radical scavenger, a coupling agent, a tilt control additive, a block or non-block polymeric material, and an adhesion promoter. Non-limiting examples of suitable photochromic Compounds, dichroic compounds, photochromic-dichroic compounds, photosensitive materials, non-photosensitive materials may be found, for example, in U.S. application Ser. No. 12/329,197, filed Dec. 8, 2008, entitled "Alignment Facilities for Optical Dyes" at paragraphs [0090]-[0102] and the references cited therein; and U.S. application Ser. No. 12/163,180, filed Jun. 27, 2008 entitled "Formulations Comprising Mesogen Containing Compounds" at paragraphs [0064]-[0084] and the references cited therein, the disclosure of each of which is incorporated by reference herein. Other non-limiting examples of dichroic dyes that may be used in conjunction with various non-limiting embodiments disclosed herein include those disclosed in U.S. Pat. No. 7,044,599, at column 7, lines 18-56, which disclosure is hereby specifically incorporated herein by reference. Non-limiting examples of photochromic-dichroic dyes that may be used in conjunction with various non-limiting embodiments disclosed herein include those materials set forth and described in U.S. Patent Application Publication Nos. 2005/0004361, at paragraph 27 to paragraph 158, and 2005/0012998 A1, at paragraphs 89 to paragraph 251, which disclosures are hereby specifically incorporated herein by reference. Non-limiting examples of suitable compositions for the one or more additives are described in detail in U.S. application Ser. No. 12/163,180, filed Jun. 27, 2008, entitled "Formulations Comprising Mesogen Containing Compounds" at paragraphs [0085]-[0108] and the references cited therein, which disclosure is incorporated by reference herein.

Still other non-limiting embodiments of the present disclosure provide for an article of manufacture comprising at least one photoalignable portion. The photoalignable portion may comprise a (co)polymer having the structure represented by either of Formula I or Formula II, wherein the groups $M^a$, $M^b$, $M^c$, $L^a$, $L^b$, $L^c$, $Z^a$, $Z^b$, and $Z^c$ have structures as set forth herein. The value of "n" ranges from 10 to 10,000 and the values for "x", "y", and "z" are as described herein.

The article of manufacture may be any type of commercial article which incorporates a photoalignment layer in which adhesion of the photoalignment layer onto a surface of a substrate and/or subsequent coating is important for the articles utility and lifespan. For example, in certain non-limiting embodiments the article of manufacture may be, but is not limited to, an active liquid crystal cell, a passive liquid crystal cell, an optical element, or an ophthalmic element. Non-limiting examples of optical elements include ophthalmic elements and devices, display elements and devices, windows, mirrors, and active and passive liquid crystal cell elements and devices. Non-limiting examples of ophthalmic elements include corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intraocular lenses, magnifying lenses, and protective lenses or visors; and may also include partially formed lenses and lens blanks. As used herein the term "display" means the visible or machine-readable representation of information in words, numbers, symbols, designs or drawings. Non-limiting examples of display elements and devices include screens, monitors, and security elements, including without limitation, security marks and authentication marks. As used herein the term "window" means an aperture adapted to permit the transmission of radiation therethrough. Non-limiting examples of windows include automotive and aircraft transparencies, filters, shutters, and optical switches. As used herein the term "mirror" means a surface that specularly reflects a large fraction of incident light. As used herein, the term "liquid crystal cell" refers to a structure containing a liquid crystal material that is capable of being ordered. Active liquid crystal cells are cells wherein the liquid crystal material is capable of being switched between ordered and disordered states or between two ordered states by the application of an external force, such as electric or magnetic fields. Passive liquid crystal cells are cells wherein the liquid crystal material maintains an ordered state. One non-limiting example of an active liquid crystal cell element or device is a liquid crystal display.

As described herein, in certain non-limiting embodiments the optical element may be a security element. Non-limiting examples of security elements include security marks and authentication marks that are connected to at least a portion of a substrate, such as and without limitation: access cards and passes, e.g., tickets, badges, identification or membership cards, debit cards etc.; negotiable instruments and non-negotiable instruments e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

Although not limiting herein, according to this non-limiting embodiment, the security element can be connected to at least a portion of a substrate chosen from a transparent substrate and a reflective substrate. Alternatively, according to certain non-limiting embodiments wherein a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Still further, security element can be connected to at least a portion of a substrate chosen from untinted substrates, tinted substrates, photochromic substrates, tinted-photochromic substrates, linearly polarizing, circularly polarizing substrates, and elliptically polarizing substrates.

Furthermore, security element according to the aforementioned non-limiting embodiment can further comprise one or more other coatings or sheets to form a multi-layer reflective security element with viewing angle dependent characteristics as described in U.S. Pat. No. 6,641,874, which is hereby specifically incorporated by reference herein.

According to other non-limiting embodiments, the present disclosure provides for optical elements. According to these non-limiting embodiments, the optical element may comprise a substrate and a first at least partial layer on at least a portion of the substrate. The first at least partial layer may comprise a copolymeric material as described herein, for example, a copolymer having a structure represented by any one of Formula I or Formula II, as described herein. As described herein, the optical element me an ophthalmic element, a display element, a window, a mirror, an active liquid crystal cell element, or a passive liquid crystal cell element.

As used herein the term "layer" or "coating" means a supported film derived from a flowable composition, which may or may not have a uniform thickness, and specifically excludes polymeric sheets. The layer or coating may be cured after application to the surface of the optical element to form a cured layer or coating. As used herein the term "sheet" means a pre-formed film having a generally uniform thickness and capable of self-support. Further, as used herein the term "connected to" means in direct contact with an object or indirect contact with an object through one or more other structures or materials, at least one of which is in direct contact with the object. Thus, according to various non-limiting embodiments disclosed herein, the at least partial coating can be in direct contact with at least a portion of the substrate or it can be in indirect contact with at least a portion of the substrate through one or more other structures or materials. For example, although not limiting herein, the at least partial coating can be in contact with one or more other at least partial coatings, polymer sheets or combinations thereof, at least one of which is in direct contact with at least a portion of the substrate. As used herein, the phrase "at least partial" when used in reference to a layer or coating means that the layer or coating covers from 5% to 100% of the area of the referenced coated area. As used herein, the phrase "at least a portion" when used in reference to a surface of a substrate means an area of the surface ranging from 1% to 100% of the total area of the surface of the substrate.

As discussed herein, copolymeric materials described herein display improved adhesion to a substrate surface and/or provide for improved adhesion of subsequent layers of coating material. One non-limiting method for measuring adhesion of coating materials, for example, adhesion of a coating material to a surface of a substrate or adhesion of subsequent coatings on a surface of a coating material is by cross-hatch adhesion tape testing. According to this method, the coating material is scored, for example with a knife, scalpel, razor blade, cross-hatch cutter or other cutting device, in a cross-hatch pattern. A pressure sensitive tape is applied to the coating surface over the cross-hatch cuts and then rapidly removed (as described by ASTM D3359). The area with the cross-hatch cuts is then inspected for coating removal and rated. In various non-limiting embodiments, the at least partial layer of the copolymeric materials on the surface of the substrate as described herein will display from 10% to 100% adherence as measured by cross-hatch adhesion test method. Other non-limiting embodiments may display from 25% to 100% adherence, from 50% to 100% adherence, or in specific embodiments even 100% adherence. As will be understood in the art, other adhesion test methods may be used to measure the adhesion of the copolymeric material to the surface of the substrate or adhesion of subsequent coatings to the copolymeric material layer. These methods include, for example, knife tests, pull-off tests, scrape tests, or other test methods. Alternative adhesion methods will yield comparable results as seen with the cross-hatch adhesion test.

According to certain non-limiting embodiments, the first at least partial layer may be at least partially aligned, as determined by application of a subsequent alignable coating and determination of the degree of alignment. As used herein, the phrase "at least partially" when used in reference to the degree of alignment of alignable materials in a layer means that from 10% to 100% of the alignable elements of the material are aligned. Other non-limiting embodiments may display from 25% to 100% alignment, from 50% to 100% alignment, or in specific embodiments even 100% alignment. The first at least partial layer may be at least partially aligned in a parallel orientation, elliptical, splay, vertical, or a helical orientation. Suitable methods for at least partially aligning the first at least partial layer include, but are not limited to, at least one of exposing the at least a portion of the composition to a magnetic field, exposing the at least a portion of the composition to a shear force, exposing the at least a portion of the composition to an electric field, exposing the at least a portion of the composition to plane-polarized ultraviolet radiation, exposing the at least a portion of the composition to infrared radiation, drying the at least a portion of the composition, etching the at least a portion of the composition, rubbing the at least a portion of the composition, and aligning the at least a portion of the composition with another structure or material, such as, but not limited to, an at least partially ordered alignment medium. Suitable alignment methods for layers are described in greater detail in U.S. Pat. No. 7,097,303, at column 27, line 17 to column 28, line 45, which disclosure is incorporated by reference herein. In specific non-limiting embodiments, the first at least partial layer may be at least partially aligned by exposure to polarized electromagnetic radiation.

According to the non-limiting embodiments wherein the at least first partial layer is at least partially aligned by exposure to polarized electromagnetic radiation, the photochemically active chromophore $Z^a$ in the (co)polymer as represented in the structures of Formulae I and II, may undergo a photochemical reaction to form an at least partially aligned structure in the (co)polymer. For example, in those structures where $Z^a$ is a dimerizable cinnamate or coumarin, the cinnamate or coumarin may undergo a photochemical [2+2] cycloaddition/dimerization with a cinnamate or coumarin on an adjacent polymer strand or at an adjacent site on the same polymer strand to form an at least partially aligned structure. Where $Z^a$ is a cis/trans isomerizable azo, the structure may undergo a photochemical cis/trans isomerization to provide an at least partially aligned structure. Where $Z^a$ is a photochemically decomposable polyimide, the polyimide may undergo a photochemical decomposition to provide an at least partially aligned structure. Where $Z^a$ is an aromatic ester capable of undergoing a photochemical Photo-Fries rearrangement, the aromatic ester may undergo a photochemical rearrangement to provide an at least partially aligned structure.

In specific non-limiting embodiments, at least one portion of the first at least partial layer may be aligned in a first direction, for example, by exposing the portion to polarized electromagnetic radiation and at least a second portion of the first at least partial layer may be aligned in a direction different that than the first direction, for example, by exposing the second portion to electromagnetic radiation that is polarized in a different direction. As will be understood by one skilled in the art, using this method, various portions of the first at least partial layer may be aligned in various directions, as desired by the user.

According to certain non-limiting embodiments, optical elements having the first at least partial layer, which may be at least partially aligned as described herein, may further comprise one or more additional at least partial layers on at least a portion of the surface of the substrate. As used herein, the phrase "on at least a portion of the surface of the substrate" includes layers applied directly onto the surface of the substrate and coating layers applied to one or more layers on the surface of the substrate. That is, the one or more additional layers may be applied directly onto the substrate surface or onto one or more intermediate layers that were previously applied to the surface of the substrate, thereby forming a laminar multilayer coating. According to various non-limiting embodiments, the one or more additional at least partial layers may be selected from a tie layer, a primer layer, an abrasion resistant coating, a hard coating, a protective coating, a reflective coating, a photochromic coating, a dichroic coating, a photochromic-dichroic coating, an anti-reflective coating, a linearly polarizing coating, a circularly polarizing coating, an elliptically polarizing coating, a transitional coating, a liquid crystal material layer, an alignment material layer, a compatibilizing coating, an functional organic coating, a retarder layer, or combinations of any thereof. In another embodiment, the additional layers are selected from a primer layer, a protective coating, a transitional coating and a combination of such coatings. In a further embodiment, the primer layer is a polyurethane.

Although not limiting herein, according to various non-limiting embodiments disclosed herein, the functional organic coating may be a polarizing coating comprising an aligned liquid crystal coating and an aligned dichroic dye. As used herein, the term "polarizing coating" refers to a coating that is adapted to confine the vibrations of the electromagnetic vector of light waves to one direction or plane. Generally, although not required, polarizing coatings comprising conventional dichroic dyes will have a constant (or "fixed") tint or color due to the presence of the dichroic dye. For example, the polarizing coating may have a brownish or bluish color or tint. Non-limiting examples of polarizing coatings comprising aligned liquid crystal materials and dichroic dyes that may be used in conjunction with various non-limiting embodiments disclosed herein are described in U.S. Patent Application Publication No. 2005/0151926, at paragraph 10 to paragraph 159, which disclosure is hereby specifically incorporated by reference.

The polarizing coating according to various non-limiting embodiments disclosed herein may further comprise a photochromic material. According to these non-limiting embodiments, the coating may be both a polarizing and a photochromic coating, i.e., one that displays both conventional polarizing properties as well as conventional photochromic properties. For example, according to various non-limiting embodiments disclosed herein, the polarizing and photochromic coating may have a first colored, polarizing state when not exposed to actinic radiation due primarily to the tint of the dichroic dye, and a second colored, polarizing state when exposed to actinic radiation due to the combined effect of the tint of the dichroic dye and the color of the photochromic material when exposed to actinic radiation. For example, if the optical element is an ophthalmic lens comprising the polarizing and photochromic coating, the lens may reversibly switch from a first colored, polarizing state when the wearer is not exposed to UV or actinic radiation from sunlight, to a second colored state, polarizing state when the wearer is exposed to UV or actinic radiation from sunlight.

Non-limiting examples of conventional photochromic coatings include coatings comprising any of the conventional photochromic compounds that are discussed in detail below. For example, although not limiting herein, the photochromic coatings can be photochromic polyurethane coatings, such as those described in U.S. Pat. No. 6,187,444; photochromic aminoplast resin coatings, such as those described in U.S. Pat. Nos. 4,756,973, 6,432,544 and 6,506,488; photochromic polysilane coatings, such as those described in U.S. Pat. No. 4,556,605; photochromic poly(meth)acrylate coatings, such as those described in U.S. Pat. Nos. 6,602,603, 6,150,430 and 6,025,026, and WIPO Publication WO 01/02449; polyanhydride photochromic coatings, such as those described in U.S. Pat. No. 6,436,525; photochromic polyacrylamide coatings such as those described in U.S. Pat. No. 6,060,001; photochromic epoxy resin coatings, such as those described in U.S. Pat. Nos. 4,756,973 and 6,268,055; and photochromic poly(urea-urethane) coatings, such as those described in U.S. Pat. No. 6,531,076. The specifications of the aforementioned U.S. patents and international publications are hereby specifically incorporated by reference herein.

Further, according to various non-limiting embodiments disclosed herein, the functional organic coating may be a photochromic-dichroic coating comprising an aligned liquid crystal coating comprising an aligned photochromic-dichroic material. As used herein, the term "photochromic-dichroic coating" refers to a coating that is adapted to display both photochromic and polarizing properties in response to at least actinic radiation. For example, according to various non-limiting embodiments disclosed herein, the functional organic coating may be a photochromic-dichroic coating that is adapted to reversibly switch from a first optically clear, non-polarizing state to a second colored, polarizing state in response to at least actinic radiation. For example, if the optical element is an ophthalmic lens comprising the photochromic-dichroic coating, the lens may reversibly switch from an optically clear, non-polarizing state when the wearer is not exposed to UV or actinic radiation, for example, out of the sunlight, to a colored, polarizing state when the wearer is exposed to UV or actinic radiation, for example, from sunlight. Non-limiting examples of such coatings are described in U.S. Patent Application Publication No. 2005/0012998, paragraph 11 to paragraph 442, which disclosure is hereby specifically incorporated by reference.

Non-limiting examples of primer layers that can be used in conjunction with various non-limiting embodiments disclosed herein include coatings comprising coupling agents, at least partial hydrolysates of coupling agents, and mixtures thereof. As used herein "coupling agent" means a material having at least one group capable of reacting, binding and/or associating with a group on at least one surface. In one non-limiting embodiment, a coupling agent can serve as a molecular bridge at the interface of at least two surfaces that can be similar or dissimilar surfaces. Coupling agents, in another non-limiting embodiment, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed. In addition to coupling agents and/or hydrolysates of coupling agents, the primer layers can comprise other adhesion enhancing ingredients. For example, although not limiting herein, the primer layers can further comprise an adhesion-enhancing amount of an epoxy-containing material. Adhesion-enhancing amounts of an epoxy-containing material when added to the coupling agent containing coating composition can improve the adhesion of a subsequently applied coating as compared to a coupling agent containing coating composition that is essentially free of the epoxy-containing material. Other non-limiting examples of primer layers that are suitable for use in conjunction with the various non-limiting embodiments disclosed herein include those described in U.S. Pat. No. 6,150,430, U.S. Pat. No. 6,042,737, and U.S. Pat. No. 6,025,026, which are hereby specifically incorporated by reference. Still further non-limiting examples of primer layers include polyurethane coating compositions such as those described in U.S. Pat. No. 6,187,444 and poly(urea-urethane) coating compositions such as those described in U.S. Pat. No. 6,532,076, both of which coating compositions may be used with or without a photochromic material, and the disclosures of both of which are hereby specifically incorporated by this reference.

Other types of functional organic coatings that may be used in accordance with various non-limiting embodiments disclosed herein include: paints, e.g., a pigmented liquid or paste used for the decoration, protection, and/or the identification of a substrate; and inks, e.g., a pigmented liquid or paste used for writing and printing on substrates, such as in producing verification marks on security documents, e.g., documents such as banknotes, passports, and drivers' licenses, for which authentication or verification of authenticity may be desired. Further, as discussed above, the aligned liquid crystal coating may comprise a material adapted to display dichroism, and at least a portion of the material adapted to display dichroism may be at least partially aligned with at least a portion of the at least partially aligned liquid crystal material.

As used herein, the term "transitional coating" refers to a coating that aids in creating a gradient in properties between two coatings. For example, although not limiting herein, a transitional coating may aid in creating a gradient in hardness between a relatively hard coating and a relatively soft coating. Non-limiting examples of transitional coatings (which may also be termed "tie-layers" or "tie-layer coatings") include radiation-cured acrylate-based thin films, for example, such as those set forth in U.S. Patent Application Publication Nos. 2003/0165686 at paragraphs 79 to paragraph 173'; 2004/0207809 at paragraphs 108 to paragraph 204; 2005/0196616 at paragraphs 107 to paragraph 158; 2005/196617 at paragraphs 24 to paragraph 129; 2005/196618 at paragraphs 28 to paragraph 291; 2005/0196626 at paragraphs 164 to paragraph 217; and 2005/196696 at paragraphs 24 to paragraph 141, which disclosures are hereby specifically incorporated herein by reference.

As used herein, the term "anti-reflective coating" refers to a coating that increases transmittance of light through a substrate by reducing the amount of light that is reflected by the substrate. Non-limiting examples of anti-reflective coatings include, for example, a monolayer or multilayer of metal oxides, metal fluorides, or other such materials. Non-limiting examples of suitable anti-reflective coatings may be found in U.S. Pat. No. 5,580,819 at column 2, line 50 to column 11, line 44, which disclosure is hereby specifically incorporated herein by reference.

Further, according to certain non-limiting embodiments disclosed herein, the additional coating may be a protective coating, such as, but not limited to, an abrasion-resistant coating, such as a "hard coat," on their exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having a protective coating, such as but not limited to an abrasion-resistant coating, on its surface(s). Other non-limiting examples of protective coatings include abrasion-resistant coatings comprising organo silanes, abrasion-resistant coatings comprising radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. For example, according to one non-limiting embodiment, the protective coating can comprise a first coating of a radiation-cured acrylate-based thin film having UV-shielding properties and a second coating comprising an organo-silane. Non-limiting examples of commercial protective coatings products include SILVUE® 124 and HI-GARD® coatings, available from SDC Coatings, Inc. and PPG Industries, Inc., respectively.

According to various non-limiting embodiments, the one or more additional at least partial layers may comprise a second at least partial layer on a surface of the first at least partial layer. In these embodiments, the second at least partial layer may comprise at least one liquid crystal material. In those non-limiting embodiments where the first at least partial layer has been at least partially aligned, as described herein, the at least one liquid crystal material of the second at least partial coating may be at least partially aligned with the alignment of the first at least partial layer. According to these non-limiting embodiments, the first at least partial layer may serve as a photoalignment layer for the liquid crystal materials in the second at least partial layer. Non-limiting examples of liquid crystal materials suitable for use with the photoalignment materials according to various non-limiting embodiments disclosed herein include the mesogen containing compounds or residues thereof, liquid crystal polymers, liquid crystal pre-polymers, liquid crystal monomers, liquid crystal mesogens, dichroic materials, and photochromic-dichroic materials. As used herein the term "pre-polymer" means partially polymerized materials.

According to various non-limiting embodiments disclosed herein wherein the second at least partial layer is an aligned liquid crystal layer, the aligned liquid crystal layer may comprise a material adapted to display dichroism, and at least a portion of the material adapted to display dichroism may be at least partially aligned with at least a portion of the at least partially aligned liquid crystal material. As used herein, the term "material adapted to display dichroism" means a material that is adapted to absorb one of two orthogonal plane polarized components of at least transmitted radiation more strongly than the other. Non-limiting examples of materials that are adapted to display dichroism include dichroic materials such as dyes and photochromic-dichroic materials such as dyes. In specific non-limiting embodiments, the at least one liquid crystal material in the second layer may be at least one dichroic material and/or photochromic-dichroic material, such as those described herein. As used herein, the term "dichroic material" means a material that has a generally constant absorption spectrum and that is adapted to absorb one of two orthogonal plane polarized components of at least transmitted radiation more strongly than the other. As used herein, the term "photochromic-dichroic material" means a material that has an absorption spectrum for at least visible radiation that varies in response to at least actinic radiation and that absorbs one of two orthogonal plane polarized components of at least transmitted radiation more strongly than the other in response to at least actinic radiation.

FIG. 1 illustrates optical element 100 according to one non-limiting embodiment described herein. In FIG. 1, the first at least partial coating 120 is applied to at least a portion of an upper surface of substrate 110. The second at least partial layer 130 is coated onto the surface of coating 120 opposite substrate 110.

According to certain non-limiting embodiments comprising a second at least partial layer comprising at least one liquid crystal material, the one or more additional at least partial layers may further comprise an at least partially aligned third at least partial layer comprising a second alignment material and a fourth at least partial layer comprising at least one second liquid crystal material. In these non-limiting embodiments, the at least partially aligned third layer may be aligned in a different direction that the at least partially aligned first layer. The at least one second liquid crystal material may then be aligned with the at least partially aligned third layer. The second alignment material may have a structure represented by any of the copolymeric materials described herein (represented by Formulae I and II), which may have the same or different in structure as the alignment material in the first at least partial layer. Alternatively, the third at least partial layer may comprise an alignment material different in structure than the copolymeric materials described herein. Further, the at least one second liquid crystal material of the fourth layer may be the same or different than the at least one liquid crystal material of the second layer. Non-limiting examples of at least one second liquid crystal materials in the fourth layer include at least one dichroic material and/or photochromic-dichroic material, as described herein.

Figure 2:
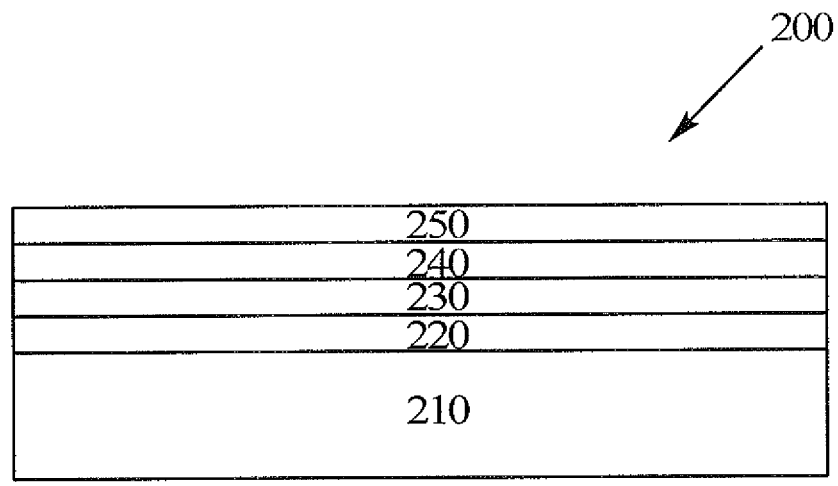
FIG. 2 illustrates a second non-limiting embodiment of an optical element according to the present disclosure.

In specific non-limiting embodiments, the partial layers on at least the portion of the surface of the substrate may be arranged in a stack or laminate on the surface of the substrate. For example, the first at least partial layer, the second at least partial layer, the third at least partial layer and the fourth at least partial layer may be in a stack on the surface of the substrate. Referring to FIG. 2, which illustrates optical element 200 according to this non-limiting embodiment, the first at least partial layer 220 is coated on the upper surface of substrate 210. The second at least partial layer 230 is coated onto the surface of layer 220 opposite substrate 210. The third at least partial layer 240 is coated onto the surface of the second layer 230 opposite the first layer 220 and the fourth at least partial layer 250 is coated on the surface of the third layer 240 opposite the second layer 230. In other non-limiting embodiments, one or more additional layers may be applied to at least a portion of the surface of the fourth at least partial layer.

Generally speaking, substrates that are suitable for use in conjunction with various non-limiting embodiments disclosed herein include, but are not limited to, substrates formed from organic materials, inorganic materials, or combinations thereof (for example, composite materials). Non-limiting examples of substrates that can be used in accordance with various non-limiting embodiments disclosed herein are described in more detail below.

Specific, non-limiting examples of organic materials that may be used to form the substrates disclosed herein include polymeric materials, such as those discussed in detail above, for examples, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

While not limiting herein, according to various non-limiting embodiments disclosed herein, the substrate can be an ophthalmic substrate. As used herein the term "ophthalmic substrate" means lenses, partially formed lenses, and lens blanks. Non-limiting examples of organic materials suitable for use in forming ophthalmic substrates according to various non-limiting embodiments disclosed herein include, but are not limited to, the art-recognized polymers that are useful as ophthalmic substrates, e.g., organic optical resins that are used to prepare optically clear castings for optical applications, such as ophthalmic lenses.

Other non-limiting examples of organic materials suitable for use in forming the substrates according to various non-limiting embodiments disclosed herein include both synthetic and natural organic materials, including without limitation: opaque or translucent polymeric materials, natural and synthetic textiles, and cellulosic materials such as, paper and wood.

Non-limiting examples of inorganic materials suitable for use in forming the substrates according to various non-limiting embodiments disclosed herein include glasses, minerals, ceramics, and metals. For example, in one non-limiting embodiment the substrate can comprise glass. In other non-limiting embodiments, the substrate can have a reflective surface, for example, a polished ceramic substrate, metal substrate, or mineral substrate. In other non-limiting embodiments, a reflective coating or layer can be deposited or otherwise applied to a surface of an inorganic or an organic substrate to make it reflective or to enhance its reflectivity.

Still further, the substrates according to various non-limiting embodiments disclosed herein can be untinted, tinted, linearly polarizing, circularly polarizing, elliptically polarizing, photochromic, or tinted-photochromic substrates. As used herein with reference to substrates the term "untinted" means substrates that are essentially free of coloring agent additions (such as, but not limited to, conventional dyes) and have an absorption spectrum for visible radiation that does not vary significantly in response to actinic radiation. Further, with reference to substrates the term "tinted" means substrates that have a coloring agent addition (such as, but not limited to, conventional dyes) and an absorption spectrum for visible radiation that does not vary significantly in response to actinic radiation.

As used herein, the term "linearly polarizing" with reference to substrates refers to substrates that are adapted to linearly polarize radiation (i.e., confine the vibrations of the electric vector of light waves to one direction). As used herein, the term "circularly polarizing" with reference to substrates refers to substrates that are adapted to circularly polarize radiation. As used herein, the term "elliptically polarizing" with reference to substrates refers to substrates that are adapted to elliptically polarize radiation. Further, as used herein, with reference to substrates, the term "tinted-photochromic" means substrates containing a coloring agent addition as well as a photochromic material, and having an absorption spectrum for visible radiation that varies in response to at least actinic radiation. Thus, for example and without limitation, the tinted-photochromic substrate can have a first color characteristic of the coloring agent and a second color characteristic of the combination of the coloring agent the photochromic material when exposed to actinic radiation.

Still other non-limiting embodiments of the present disclosure are directed to liquid crystal cells. According to these non-limiting embodiments the liquid crystal cells may comprise a first substrate comprising first surface, a second substrate comprising a second surface opposite the first surface of the first substrate, a first at least partial layer on at least a portion of the first surface facing the second surface, a second at least partial layer on at least a portion of the second surface facing the first surface, the first at least partial layer and the second at least partial layer defining a space there between, and a liquid crystal material in the space between the first at least partial layer and the second at least partial layer. According to various non-limiting embodiment, the first at least partial layer and the second at least partial layer are alignment layers. In certain non-limiting embodiments, at least one of the first at least partial layer and the second at least partial layer may comprise a (co)polymer having a structure represented by one of Formulae I and II as set forth herein, wherein the groups $M^a$, $M^b$, $M^c$, $L^a$, $L^b$, $L^c$, $Z^a$, $Z^b$, and $Z^c$ have structures as set forth herein. The value of "n" ranges from 10 to 10,000 and the values for "x", "y", and "z" are as described herein. Suitable substrates for the first and second substrates of the liquid crystal cell may include any of the substrates described herein. In specific non-limiting embodiments, the first and second substrate may be capable of transmitting electromagnetic radiation through the substrate material (that is, the substrates are optically clear, transparent, or translucent).

In specific non-limiting embodiments, both the first at least partial layer and the second at least partial layer may comprise a (co)polymer having the structure represented by one of Formulae I and II. In specific non-limiting embodiments where both the first and second layers comprise a (co)polymer material as described herein, the (co)polymer on the first surface may have the same polymer structure as the (co)polymer on the second surface. That is, the (co)polymer on both the first and second surfaces has the same monomeric structures for $M^a$, $M^b$, $M^c$, $L^a$, $L^b$, $L^c$, $Z^a$, $Z^b$, and $Z^c$. In other non-limiting embodiments, the polymeric structure of the (co)polymer on the first surface may be different than the polymeric structure of the (co)polymer on the second surface. That is, although the (co)polymer on both the first and second surface may have structures that may be represented by one of Formulae I and II, the polymeric structure on each surface may differ in the structure of at least one of $M^a$, $M^b$, $M^c$, $L^a$, $L^b$, $L^c$, $Z^a$, $Z^b$, and $Z^c$.

In certain non-limiting embodiments, at least one of the first at least partial layer and the second at least partial layer is at least partially aligned. For example, one or both of the first layer and the second layer may be at least partially aligned. The first and/or second layer may be aligned by any of the alignment methods described herein. In specific, non-limiting embodiments, the surfaces may be aligned by exposure to polarized electromagnetic radiation, for example, plane polarized UV radiation. In one non-limiting embodiment, the alignment of the first at least partial layer may be in the same direction as the alignment of the second at least partial layer. In other non-limiting embodiments, the alignment of the first at least partial layer may be in a different direction than the alignment of the second at least partial layer.

In specific non-limiting embodiments, the liquid crystal cell may be an active liquid crystal cell or a passive liquid crystal cell. According to various non-limiting embodiments, the liquid crystal material in the liquid crystal cells described herein, may be any liquid crystal material known in the art, such as those referenced herein. In specific non-limiting embodiments, the liquid crystal material may be a liquid crystal material that is capable of being aligned by the alignment layer comprising the first layer, the alignment layer comprising the second layer, or both alignment layers (i.e., the first and second layers). According to specific non-limiting embodiments, the liquid crystal material may comprise at least one of a dichroic material or a photochromic-dichroic material, including, but not limited to any of the dichroic material or photochromic-dichroic materials described or referenced herein.

The liquid crystal cell may be utilized as, for example, but not limited to, display elements, including screens, monitors, or security elements. According to certain non-limiting embodiments, the liquid crystal cell may be a pixelated cell. As used herein, the term "pixelated" means that an article, such as a display element or liquid crystal cell may be broken down into a plurality of individual pixels (i.e., single point occupying a specific location within a display, image or cell. In certain non-limiting embodiments, the liquid crystal cell may be a pixilated cell comprising a plurality of regions or compartments (i.e., pixels). The characteristics of the individual pixels, such as color, polarization and the like, may be controlled relative to the other pixels in the display element, liquid crystal, or article.

Figure 3:
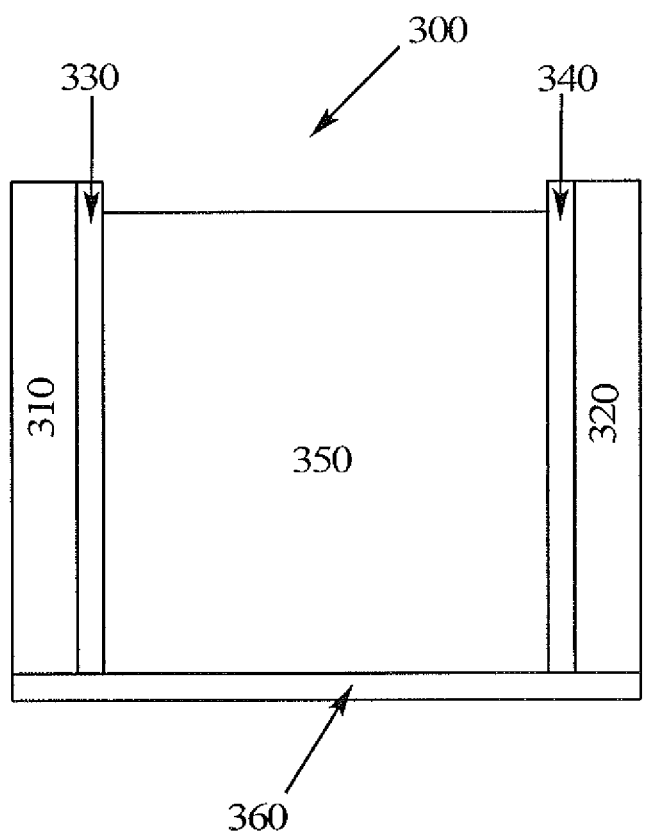
FIG. 3 illustrates one non-limiting embodiment of a liquid crystal cell according to the present disclosure.

One non-limiting embodiment of a liquid crystal cell according to the present disclosure is illustrated in FIG. 3. According to this embodiment, liquid crystal cell 300 comprises first surface 310 and second surface 320 opposite first surface 310. First surface 310 has a layer of an alignment material 330 facing the second surface 320 and the second surface 320 has a layer of an alignment material 340 facing the first surface. Cell 300 may also comprise a bottom substrate 360 and will contain liquid crystal material 350 in the space defined by the first and second surfaces.

Further non-limiting embodiments of the present disclosure provide for methods of applying a photoalignment material to an optical element, such as any of the optical elements described herein. According to specific non-limiting embodiments, the methods may comprise applying an at least partial layer of a photoalignment (co)polymer material onto at least a portion of a surface of a substrate, forming an attractive bond between one or more adhesion promoter groups ($Z^b$) on the polymeric structure of the photoalignment (co)polymer material and a compatible group on the surface of the substrate, and at least partially aligning at least a first portion of the photoalignment (co)polymer material by exposing the at least partial layer to polarized UV radiation. According to these non-limiting embodiments, the photoalignment material may have a structure represented by the (co)polymeric structures described herein, such as those represented by Formula I or II as set forth herein, wherein the groups $M^a$, $M^b$, $M^c$, $L^a$, $L^b$, $L^c$, $Z^a$, $Z^b$, and $Z^c$ have structures as set forth herein. The value of "n" ranges from 10 to 10,000 and the values for "x", "y", and "z" are as described herein.

According to these non-limiting embodiments, the substrate may be any of the substrates for optical elements described in detail herein. As used herein, the term "compatible group" means a functional group, moiety or molecular architecture that can form an attractive force with the adhesion group, including a covalent bond, a polar covalent bond, an ionic bond, a hydrogen bond, an electrostatic attraction, a hydrophobic interaction, a van der Waals attraction, or a combination of two or more of these attractive forces.

Specific non-limiting methods for applying the at least partial layer of the photoalignment (co)polymer, as described herein, on at least a portion of a surface of a substrate, are described in detail in U.S. Pat. No. 7,342,112 at column 83, line 16 of column 84, line 10, the disclosure of which is incorporated herein in its entirety. These disclosed methods include methods for forming articles, such as optical elements and ophthalmic elements, which may also include at least one of a dichroic compound or a photochromic-dichroic compound, by a variety of methods known in the art, such as, but not limited to, imbibing, coating, overmolding, spin coating, spray coating, spray and spin coating, curtain coating, flow coating, dip coating, injection molding, casting, roll coating, spread coating, casting-coating, reverse roll-coating, transfer roll-coating, kiss/squeeze coating, gravure roll-coating, slot-die coating, blade coating, knife coating, and rod/bar coating and wire coating. Various coating methods suitable for use in certain non-limiting embodiments of the present disclosure are described in "Coating Processes", Kirk-Othmer Encyclopedia of Chemical Technology, Volume 7, pp 1-35, 2004. Methods of imbibition are described in U.S. Pat. No. 6,433,043 at column 1, line 31 to column 13, line 54. The disclosure of each of these references is incorporated in their entirety by this reference. According to certain non-limiting embodiments, the at least partially coated substrate may be part of an optical element, such as described herein. In specific non-limiting embodiments, the optical element may be an ophthalmic element, such as corrective and non-corrective lenses, including single vision or multi-vision lenses, which may be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors; and may also include partially formed lenses and lens blanks. In other non-limiting embodiments, the at least partially coated substrate may be incorporated into an article of manufacture, as described herein.

In specific non-limiting embodiments, the methods may further comprise at least partially aligning at least a second portion of the photoalignment (co)polymer material by exposing the at least partial layer of the photoalignment (co)polymer material at the second portion to polarized UV radiation, wherein the alignment direction of the first portion of the photoalignment (co)polymer material is different than the alignment direction of the second portion of the photoalignment (co)polymer material. For example, by selectively exposing the second portion of the photoalignment (co)polymer material to polarized UV radiation that is polarized in a different direction than the polarized UV radiation used to align the first portion, the first and second (and subsequent portions) may have different alignments. Selectively exposing one portion may be readily accomplished, for example, by masking off or blocking from exposure the section of the substrate that is either not aligned or aligned in a different direction. Using this method, patterns may be formed in the photoalignment (co)polymer material wherein the alignments of the various portions of the photoalignment (co)polymer material define the pattern.

According to still other non-limiting embodiments of the various methods described herein, the methods may further comprise applying a second at least partial layer comprising a liquid crystal material to at least a portion of a surface of the photoalignment (co)polymer material and at least partially aligning the liquid crystal material with an alignment of the at least partially aligned photoalignment (co)polymer material. The liquid crystal material may be any liquid crystal useful in the art, for example, any of the liquid crystal materials cited or referenced herein. In specific non-limiting embodiments, the liquid crystal material may be at least one of a dichroic material or a photochromic-dichroic material.

As discussed herein, in specific non-limiting embodiments, the adhesion promoter groups on the (co)polymer material may also form attractive bonds with the second at least partial layer. In many instances, it may be desirable not only to have improved adhesion between the photoalignment material in the first layer and the substrate but also to have improved adhesion between the photoalignment material in the first layer and the material in the second layer. According to these specific non-limiting embodiments, the methods may further comprise forming an attractive bond (such as those described herein) between one or more adhesion promoter groups on the surface of the photoalignment (co)polymer material and a compatible group in the second at least partial layer. The compatible group may be in the structure of the material that forms the second at least partial layer, such as the coating or film material, for example a polymeric material.

The various non-limiting embodiments of the methods of the present disclosure may further comprise applying at least one additional layer to at least a portion of a surface of the photoalignment (co)polymer material. As described herein, the at least one additional layer may be applied directly to the surface of the photoalignment (co)polymer material or alternatively, applied to the surface of a layer that has been applied to the surface of the photoalignment (co)polymer material. By this method, a stack or laminate of different layers may be applied to the surface of the photoalignment (co)polymer material. In various non-limiting embodiments, the at least one additional layer may be selected from a tie layer, a primer layer, an abrasion resistant coating, a hard coating, a protective coating, a reflective coating, a photochromic coating, an anti-reflective coating, a linearly polarizing coating, a circularly polarizing coating, an elliptically polarizing coating, a transitional coating, a liquid crystal material coating an alignment material coating, or combinations of any thereof. In those non-limiting embodiments, there the additional layer is applied directly to the surface of the photoalignment (co)polymer material, the additional coating may comprise one or more compatible group, such that the method may comprise forming an attractive bond between one or more adhesion promoter groups on the surface of the photoalignment (co)polymer material and the one or more compatible group in the additional layer.

Generally the thickness of the at least partial coatings can be any thickness necessary to achieve the desired thickness for the article of manufacture or optical element. For example and without limitation, according to various non-limiting embodiments, the first at least partial coating can have a thickness ranging from: 0.005 to 1000 microns, 0.05 to 100 microns, 0.5 to 50 microns, or even 2 to 8 microns. Further, although not limiting herein, according to certain non-limiting embodiments, the thickness of the first at least partial coating can be greater than or less than the thickness of the at least one additional at least partial coating. The second at least partial coating and any additional coating may have a thickness ranging from 0.5 to 10 microns, 1 to 10 microns, or even 0.5 to 5 microns. The thickness of the second at least partial coating may be the same as the first at least partial coating or, as described herein, in certain non-limiting embodiments may be greater or less than the thickness of the first at least partial coating.

According to specific non-limiting embodiments, the present disclosure provides for the following photoalignment materials:

a) Poly[((E)-2-methoxy-4-(3-methoxy-3-oxoprop-1-enyl) phenyl 4-(6-(methacryloyloxy)hexyloxy)benzoate)-co-(2-[(3,5-dimethylpyrazolyl)carboxyamino]ethyl methacrylate)];

b) Poly[((E)-2-methoxy-4-(3-methoxy-3-oxoprop-1-enyl) phenyl 4-(6-(methacryloyloxy)hexyloxy)benzoate)-co-(2-[(3,5-dimethylpyrazolyl)carboxyamino]ethyl methacrylate)-co-(γ-methacryloxypropyltrimethoxysilane)];

c) Poly[((E)-2-methoxy-4-(3-methoxy-3-oxoprop-1-enyl) phenyl 4-(6-(methacryloyloxy)hexyloxy)benzoate)-co-(2-isocyanatoethyl methacrylate)];

d) Poly[((E)-2-methoxy-4-(3-methoxy-3-oxoprop-1-enyl) phenyl 4-(6-(methacryloyloxy)hexyloxy)benzoate)-co-(2-isocyanatoethyl methacrylate)-co-(γ-methacryloxypropyl trimethoxysilane)];

e) Poly[((E)-2-methoxy-4-(3-methoxy-3-oxoprop-1-enyl) phenyl 4-(6-(methacryloyloxy)hexyloxy)benzoate)-co-(γ-methacryloxypropyltrimethoxysilane)];

f) Poly[((E)-2-methoxy-4-(3-methoxy-3-oxoprop-1-enyl) phenyl 4-(6-(methacryloyloxy)hexyloxy)benzoate)-co-(2-hydroxyethyl methacrylate)-co-(γ-methacryloxypropyl-trimethoxysilane)];

g) Poly[((E)-2-methoxy-4-(3-methoxy-3-oxoprop-1-enyl) phenyl 4-(6-(methacryloyloxy)hexyloxy)benzoate)-co-(3-isopropenyl-α,α-dimethylbenzyl isocyanate)];

h) Poly[((E)-2-methoxy-4-(3-methoxy-3-oxoprop-1-enyl)phenyl 4-(6-(methacryloyloxy)hexyloxy)benzoate)-co-(2-(tert-butylamino)ethyl methacrylate)];

i) Poly[((E)-2-methoxy-4-(3-methoxy-3-oxoprop-1-enyl)phenyl 4-(6-(methacryloyloxy)hexyloxy)benzoate)-co-(2-[(3,5-dimethylpyrazol)carboxyamino]ethyl methacrylate)-co-(4-methoxyphenyl 4-((6-(acryloyloxy)hexyl)oxy)benzoate];

j) Poly[((E)-2-methoxy-4-(3-methoxy-3-oxoprop-1-enyl)phenyl 4-(6-(methacryloyloxy)hexyloxy)benzoate)-co-(methyl methacrylate)-co-(glycidyl methacrylate)]; and k) Poly[((E)-2-methoxy-4-(3-methoxy-3-oxoprop-1-enyl)phenyl 4-(6-(methacryloyloxy)hexyloxy)benzoate)-co-(2-[(3,5-dimethylpyrazolyl)carboxyamino]ethyl methacrylate)-co-(hexyl methacrylate)].

One having ordinary skill in the art in view of the present disclosure will recognize that other polymeric materials having structures represented by the Formulae I and II may be used as photoalignment layers possessing improved adhesion properties and that the present disclosure should not be limited to those molecular structures specifically disclosed herein.

Various non-limiting embodiments of the present invention, or aspects thereof, are more particularly described in the following non-limiting examples. It should be appreciated that the following examples are intended merely as illustrative examples, as modification and variations thereof, which are within the spirit and scope of the present invention as set forth in the claims, will be apparent to those skilled in the art.

While the present invention is described herein in connection with certain embodiments and examples, the present invention is not limited to the particular embodiments and examples disclosed, but is intended to cover modifications that are within the spirit and scope of the invention, as defined by the appended claims. Further, it is to be understood that the present description illustrates aspects of the invention relevant to a clear understanding of the invention. Accordingly, certain aspects of the invention that would be apparent to those of ordinary skill in the art and that, therefore, would not facilitate a better understanding of the invention have not been presented in order to simplify the present description.

EXAMPLES

In Part 1 of the Examples, the preparation of the photoalignment materials of the present disclosure as Examples 1-9 and a Comparative Example (CE) is described. In Part 2, liquid crystal coating components and formulations are described including the liquid crystal monomers, photochromic materials and dichroic dyes. Part 3 describes the preparation and application of coatings of the photoalignment material alone, with liquid crystal coating formulations (LCCF) on different substrates or with a "stack" of coatings on polycarbonate lenses. Part 4 describes adhesion testing and results of the photoalignment materials separately and with an applied liquid crystal coating formulation ("LCCF") in Table 1 and in a coating stack in Table 2.

Part 1 Photoalignment Materials

Example 1

Poly[((E)-2-methoxy-4-(3-methoxy-3-oxoprop-1-enyl)phenyl 4-(6-(methacryloyloxy)hexyloxy)benzoate)-co-(2-[(3,5-dimethylpyrazolyl)carboxyamino]ethyl methacrylate)]

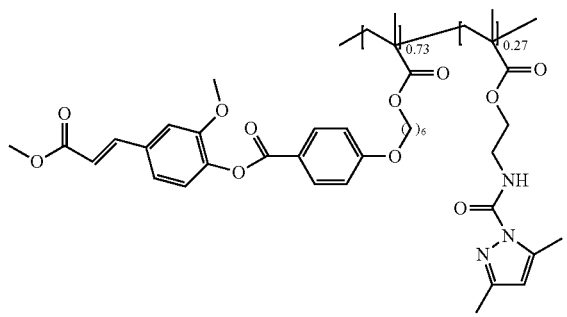

The following materials were added to a 50 mL Schenk tube: (E)-2-methoxy-4-(3-methoxy-3-oxoprop-1-enyl)phenyl 4-(6-(methacryloyloxy)hexyloxy)benzoate (2.83 g, 0.0057 mole), 2-[(3,5-dimethylpyrazolyl)carboxyamino]ethyl methacrylate having CAS#78279-10-4 available from Showa Denko (0.478 g, 0.0019 mole), 2,2'-azobis(2-methylpropionitrile) (0.0062 g, 0.000038 mole) and cyclopentanone (14.17 g). The tube was cooled in dry ice-acetone bath and degassed by vacuum pump followed by filling with $N_2$. This process was repeated five times. The tube was placed in an oil bath maintained at 60° C. and stirred for 16 hrs. Polymer molecular weight was analyzed by Gel Permeation Chromatography ("GPC") using a column calibrated with a polystyrene standard. The results were as follows: Mn=43,864; Mw=123,738; Mw/Mn=2.82.

Example 2

Poly[((E)-2-methoxy-4-(3-methoxy-3-oxoprop-1-enyl)phenyl 4-(6-(methacryloyloxy)hexyloxy)benzoate)-co-(2-[(3,5-dimethylpyrazolyl)carboxyamino]ethyl methacrylate)-co-(γ-methacryloxypropyltrimethoxysilane)]

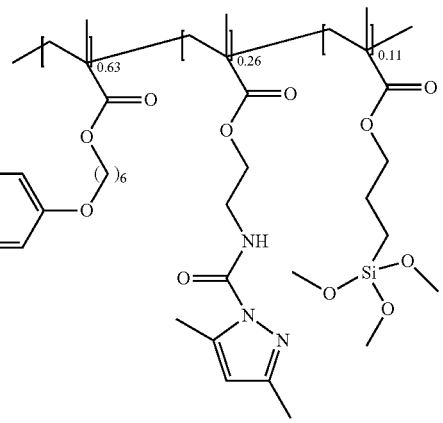

The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (1 g, 0.002 mole), 2-[(3,5-dimethylpyrazolyl)carboxyamino]ethyl methacrylate (0.1807 g, 0.00074 mole), γ-methacryloxypropyltrimethoxysilane (0.0357 g, 0.0001 mole), 2,2'-azobis(2-methylpropionitrile) (0.0047 g, 0.00003 mole) and the solvent cyclopentanone (5 g). Polymer molecular weight was analyzed by GPC using a column calibrated with a polystyrene standard. The results were as follows: $M_n$=54,144; $M_w$=116,402; and $M_w/M_n$=2.15.

The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (1 g, 0.002 mole), 2-isocyanatoethyl methacrylate (0.104 g, 0.00067 mole), γ-methacryloxypropyltrimethoxysilane (0.033 g, 0.00013 mole), 2,2'-azobis(2-methylpropionitrile) (0.0044 g, 0.00003 mole) and the solvent cyclopentanone (5 g). Polymer molecular weight was analyzed by GPC using a column calibrated with a polystyrene standard. The results were as follows $M_n$=58,015; $M_w$=153,397; $M_w/M_n$=2.64.

Example 3

Poly[((E)-2-methoxy-4-(3-methoxy-3-oxoprop-1-enyl)phenyl 4-(6-(methacryloyloxy)hexyloxy)benzoate)-co-(2-isocyanatoethyl methacrylate)]

Example 5

Poly[((E)-2-methoxy-4-(3-methoxy-3-oxoprop-1-enyl)phenyl 4-(6-(methacryloyloxy)hexyloxy)benzoate)-co-(γ-methacryloxypropyltrimethoxysilane)]

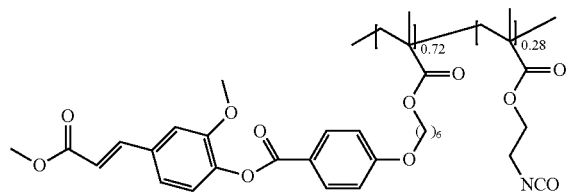

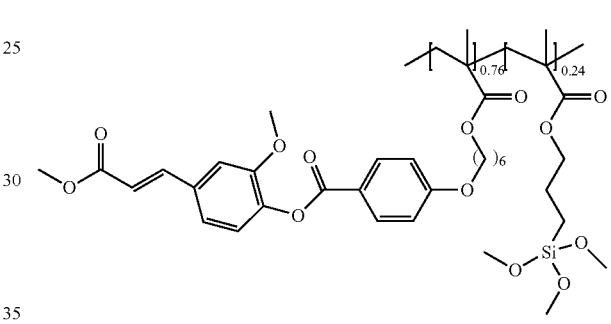

The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (1 g, 0.002 mole), 2-isocyanatoethyl methacrylate (0.104 g, 0.00067 mole), 2,2'-azobis(2-methylpropionitrile) (0.0044 g, 0.00003 mole) and the solvent cyclopentanone (5 g). Polymer molecular weight was analyzed by GPC using a column calibrated with a polystyrene standard. The results were as follows $M_n$=57,351; $M_w$=149,825; $M_w/M_n$=2.61.

Example 4

Poly[((E)-2-methoxy-4-(3-methoxy-3-oxoprop-1-enyl)phenyl 4-(6-(methacryloyloxy)hexyloxy)benzoate)-co-(2-isocyanatoethyl methacrylate)-co-(γ-methacryloxypropyltrimethoxysilane)]

The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (1 g, 0.002 mole), γ-methacryloxypropyltrimethoxysilane (0.150 g, 0.0006 mole), 2,2'-azobis(2-methylpropionitrile) (0.0066 g, 0.00004 mole) and the solvent cyclopentanone (5 g). Polymer molecular weight was analyzed by GPC using a column calibrated with a polystyrene standard. The results were as follows Mn=56,498; Mw=139,980; Mw/Mn=2.47.

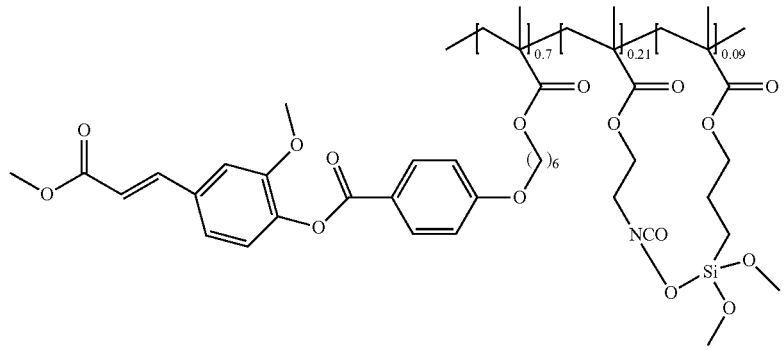

Example 6

Poly[((E)-2-methoxy-4-(3-methoxy-3-oxoprop-1-enyl)phenyl 4-(6-(methacryloyloxy)hexyloxy)benzoate)-co-(2-hydroxyethyl methacrylate)-co-(γ-methacryloxypropyltrimethoxysilane)]

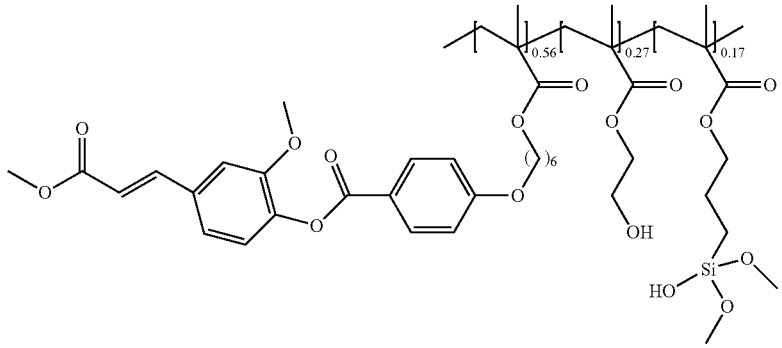

The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (1 g, 0.002 mole), 2-hydroxyethyl methacrylate (0.131 g, 0.00101 mole), γ-methacryloxypropyltrimethoxysilane (0.150 g, 0.0006 mole), 2,2'-azobis(2-methylpropionitrile) (0.0066 g, 0.00004 mole) and the solvent cyclopentanone (5 g). Polymer molecular weight was analyzed by GPC using a column calibrated with a polystyrene standard. The results were as follows $M_n$=70,329; $M_w$=193,335; $M_w/M_n$=2.74.

Example 7

Poly[((E)-2-methoxy-4-(3-methoxy-3-oxoprop-1-enyl)phenyl 4-(6-(methacryloyloxy)hexyloxy)benzoate)-co-(3-isopropenyl-α,α-dimethylbenzyl isocyanate)]

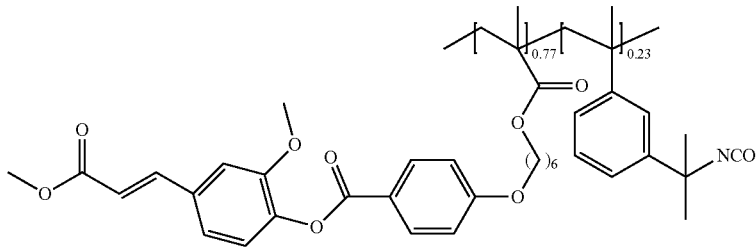

The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (0.5 g, 0.001 mole), 3-Isopropenyl-α,α-dimethylbenzyl isocyanate (0.0608 g, 0.0003 mole), 2,2'-azobis(2-methylpropionitrile) (0.0033 g, 0.00002 mole) and the solvent cyclopentanone (2.5 g). Polymer molecular weight was analyzed by GPC using a column calibrated with a polystyrene standard. The results were as follows: $M_n$=6,480; $M_w$=8,702; $M_w/M_n$=1.34.

Example 8

Poly[((E)-2-methoxy-4-(3-methoxy-3-oxoprop-1-enyl)phenyl 4-(6-(methacryloyloxy)hexyloxy)benzoate)-co-(2-(tert-butylamino)ethyl methacrylate)]

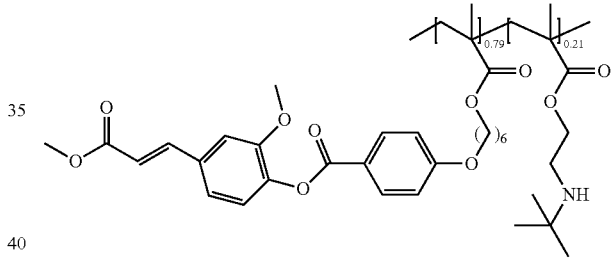

The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (0.5 g, 0.001 mole), 2-(tert-butylamino)ethyl methacrylate (0.056 g, 0.0003 mole), 2,2'-azobis(2-methylpropionitrile) (0.0033 g, 0.00002 mole) and the solvent cyclopentanone (2.5 g). Polymer molecular weight was analyzed by GPC using a column calibrated with a polystyrene standard. The results were as follows: $M_n$=5,435; $M_w$=10,793; $M_w/M_n$=1.98.

Example 9

Poly[((E)-2-methoxy-4-(3-methoxy-3-oxoprop-1-enyl)phenyl 4-(6-(methacryloyloxy)hexyloxy)benzoate)-co-(2-[(3,5-dimethylpyrazolyl)carboxyamino] ethyl methacrylate)-co-(4-methoxyphenyl 4((6-(acryloyloxy)hexyl)oxy)benzoate]

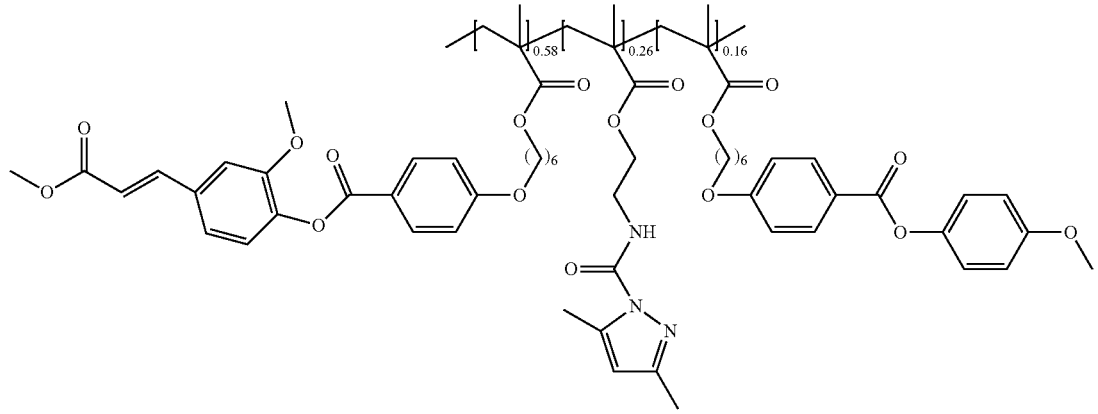

The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (4 g, 0.008 mole), 2-[(3,5-dimethylpyrazolyl)carboxyamino]ethyl methacrylate (0.778 g, 0.003 mole), 4-methoxyphenyl 4-((6-(acryloyloxy)hexyl)oxy)benzoate (0.4069 g, 0.0012 mole), 2,2'-azobis(2-methylpropionitrile) (0.0204 g, 0.00012 mole) and the solvent cyclopentanone (20 g). Polymer molecular weight was analyzed by GPC using a column calibrated with a polystyrene standard. The results were as follows: $M_n$=68,687; $M_w$=310,178; $M_w/M_n$=4.51.

Comparative Example (CE)

Poly[(E)-2-methoxy-4-(3-methoxy-3-oxoprop-1-enyl)phenyl 4-(6-(methacryloyloxy)hexyloxy)benzoate]

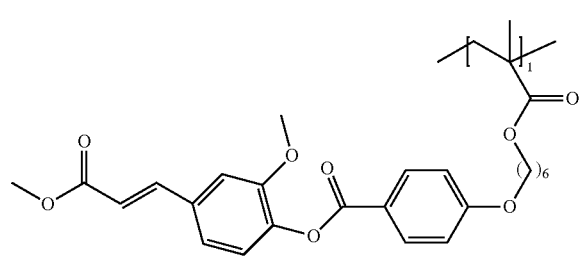

A homopolymer lacking a group capable as serving as an adhesion promoter was prepared as a comparative example. The procedure of Example 1 was followed except that the following materials in the amounts specified were used: (E)-2-methoxy-4-(3-methoxy-3-oxoprop-1-enyl)phenyl 4-(6-(methacryloyloxy)hexyloxy)benzoate (5 g, 0.010 mole), 2,2'-azobis(2-methylpropionitrile) (0.0083 g, 0.00005 mole) and the solvent cyclopentanone (25 g). Polymer molecular weight was analyzed by GPC using a column calibrated with a polystyrene standard. The results were as follows: $M_n$=78,058; $M_w$=171,016; and $M_w/M_n$=2.19.

Part 2

Liquid Crystal Coating Components and Formulations

"LCM" represents liquid crystal monomers.
"DD" represents dichroic dye.
"PC" represents photochromic materials.
"LCCF" represents liquid crystal coating formulation.

LCM-1 is 1-(6-(6-(6-(6-(6-(6-(6-(6-(8-(4-(4-(4-(8-acryloyloxyhexyl)oxy)benzoyloxy)phenyloxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexyloxy)-6-oxohexan-1-ol which was prepared according to the procedures described in Example 17 of U.S. Patent Publication 2009/0323011, which liquid crystal monomer disclosure is incorporated herein by reference.

LCM-2 is commercially available RM257 reported to be 4-(3-acryloyloxypropyloxy)-benzoic acid 2-methyl-1,4-phenylene ester, available from EMD Chemicals, Inc., having the molecular formula of $C_{33}H_{32}O_{10}$.

LCM-3 is commercially available RM105 reported to be 4-methoxy-3-methylphenyl 4-(6-(acryloyloxy)hexyloxy) benzoate, available from EMD Chemicals, Inc., having the molecular formula of $C_{23}H_{26}O_6$.

LCM-4 is commercially available RM23 is be reported to 4-(6-acryloyloxy hexyloxy)-benzoic acid (4-cyanophenyl ester), available from EMD Chemicals, Inc., having the molecular formula of $C_{23}H_{23}NO_5$.

DD-1 is reported to be Ethyl 4-((4-((E)-(4-((E)-phenyldiazenyl)naphthalen-1-yl)diazenyl)phenoxy)methyl)benzoate and was prepared as described in paragraph [0221] of U.S. Patent Application Publication 2009/0146104A1, which disclosure is incorporated herein by reference.

PC-1 is reported to be 2-Phenyl-2-{4-[4-(4-methoxyphenyl)-piperazin-1-yl]-phenyl}-5-(2-methoxyethyloxycarbonyl)-6-methyl-8-(4-(4-(4-(trans)-pentylcyclohexyl)benzoyloxy)phenyl-2H-naphtho[1,2-b]pyran and was prepared following the procedures of U.S. Pat. No. 7,342,112, which disclosure is incorporated herein by reference.

PC-2 is reported to be 3-(4-Fluorophenyl-3-(4-piperazinophenyl)-13-ethyl-13-methoxy-6-methoxy-7-(4-(4-(4-(trans)pentylcyclohexyl)benzoyloxy)-phenyl)benzoyloxy-indeno[2',3':3,4]naphtho[1,2-b]pyran and was prepared following the procedures of U.S. Pat. No. 7,342,112, which disclosure is incorporated herein by reference.

LCCF-1 was prepared as follows:

Step 1—To a suitable flask containing a mixture of anisole (3.5 g) and BYK®-346 additive (0.035 g, reported to be a polyether modified poly-dimethyl-siloxane available from BYK Chemie, USA), was added LCM-2 (3.25 g), LCM-3 (3.25 g), DD-1 (0.39 g), 4-methoxyphenol (0.0098 g), and IRGACURE® 819 (0.0975 g, a photoinitiator available from Ciba-Geigy Corporation). The resulting mixture was stirred for 2 hours at 80° C. and cooled to about 26° C.

Step 2—Hydroxyethyl methacrylate (0.65 g) and dibutyltin dilaurate (0.008 g) were added and the resulting mixture was stirred for 30 minutes at about 26° C.

LCCF-2 was prepared as follows. The procedure used to prepare LCCF-1 was followed except that DD-1 was not added to the mixture.

LCCF-3 was prepared as follows:

Step 1—To a suitable flask containing a mixture of anisole (3.4667 g) and BYK®-346 additive (0.0347 g, reported to be a polyether modified poly-dimethyl-siloxane available from BYK Chemie, USA), was added LCM-2 (1.3 g), LCM-3 (1.3 g), LCM-4 (1.3 g), LCM-5 (1.3 g), 4-methoxyphenol (0.0078 g), and IRGACURE® 819 (0.078 g, a photoinitiator available from Ciba-Geigy Corporation). The resulting mixture was stirred for 2 hours at 80° C. and cooled to about 26° C.

Step 2—Hydroxyethyl methacrylate (0.65 g) and dibutyltin dilaurate (0.008 g) were added and the resulting mixture was stirred for 30 minutes at about 26° C.

LCCF-4 was prepared as follows. The procedure used to prepare LCCF-3 was followed except that in Step 1, PC-2 (0.31 g) was also added to the reaction mixture.

LCCF-5 was prepared as follows. The procedure used to prepare LCCF-3 was followed except that in Step 1, PC-1 (0.312 g) was also added to the reaction mixture.

LCCF-6 was prepared as follows. To a suitable flask containing a mixture of anisole (1.4808 g) and BYK®-346 additive (0.0148 g, reported to be a polyether modified poly-dimethyl-siloxane available from BYK Chemie, USA), was added LCM-2 (1.0 g), LCM-3 (1.0 g), LCM-1 (1.0 g), DD-1 (0.165 g), 4-methoxyphenol (0.0041 g), and IRGACURE® 819 (0.0413 g, a photoinitiator available from Ciba-Geigy Corporation). The resulting mixture was stirred for 2 hours at 80° C.

LCCF-7 was prepared as follows. To a suitable flask containing a mixture of anisole (1.7407 g) and BYK®-346 additive (0.0174 g, reported to be a polyether modified poly-dimethyl-siloxane available from BYK Chemie, USA), was added LCM-1 (0.5 g), LCM-2 (0.5 g), LCM-3 (0.5 g), LCM-4 (0.5 g), LCM-5 (0.5 g), PC-2 (0.156 g), 4-methoxyphenol (0.0039 g), and IRGACURE® 819 (0.0392 g, a photoinitiator available from Ciba-Geigy Corporation). The resulting mixture was stirred for 2 hours at 80° C.

Part 3

Preparation of Coatings for Aligned Liquid Crystal Coated Substrates

Part 3-1

Preparation of Primer

Into a 250 mL amber glass bottle equipped with a magnetic stir-bar following materials were added in the amounts indicated:
Polyacrylate polyol (15.2334 g) (Composition D of Example 1 in U.S. Pat. No. 6,187,444, which polyol disclosure is incorporated herein by reference);
Polyalkylenecarbonate diol (40.0000 g) T-5652 from Asahi Kasei Chemicals;
DESMODUR® PL 340 (33.7615 g) from Bayer Material Science;
TRIXENE® BI 7960 (24.0734 g) from Baxenden);
Polyether modified polydimethylsiloxane (0.0658 g) BYK®-333 from BYK-Chemie GmbH);
Urethane catalyst (0.8777 g) KKAT® 348 from King Industries;
γ-Glycidoxypropyltrimethoxysilane (3.5109 g) A-187 from Momentive Performance Materials;
Light stabilizer (7.8994 g) TINUVIN® 928 from Ciba Specialty Chemicals; and
1-Methyl-2-pyrrolidinone (74.8250 g) from Sigma-Aldrich).
The mixture was stirred at room temperature for 2 hrs to yield a solution having 50 weight % final solids based on the total weight of the solution.

Part 3-2

Preparation of Photoalignment Coatings

Solutions of each of the photoalignment materials of Examples 1 and 9 and of the Comparative Example were prepared by dilution to 4 weight percent in cyclopentanone, based on the total weight of the solution.

Part 3-3

Liquid Crystal Coating Formulations

The Liquid crystal coating formulations (LCCF) 1 to 7 were prepared as described herein above in Part 2.

Part 3-4

Transitional Layer Coating Formulation (TLCF)

The TLCF was prepared as follows:
In a 50 mL amber glass bottle equipped with a magnetic stir-bar following materials were added:
Hydroxy methacrylate (1.242 g) from Sigma-Aldrich;
Neopentyl glycol diaciylate (13.7175 g) SR247 from Sartomer;
Trimethylolpropane trimethacrylate (2.5825 g) SR350 from Sartomer;
DESMODUR® PL 340 (5.02 g) from Bayer Material Science;
IRGACURE®-819 (0.0628 g) from Ciba Speciality Chemicals;

DAROCUR® TPO (0.0628 g; from Ciba Speciality Chemicals,
Polybutyl acrylate (0.125 g),
3-Aminopropylpropyltrimethoxysilane (1.4570 g) A-1100 from Momentive Performance Materials; and
200 proof absolute anhydrous Ethanol (1.4570 g) from Pharmaco-Aaper.

The mixture was stirred at room temperature for 2 hrs.

Part 3-5

Protective Coating Formulation (PCF)

The PCF (Hard Coat) was prepared as follows: Charge 1 was added to a clean dry beaker and placed in an ice bath at 5 C with stirring. Charge 2 was added and an exotherm raised the temperature of the reaction mixture to 50 C. The temperature of the resulting reaction mixture was cooled to 20-25 C and Charge 3 was added with stirring. Charge 4 was added to adjust the pH from about 3 to about 5.5. Charge 5 was added and the solution was mixed for half an hour. The resulting solution was filtered through a nominal 0.45 micron capsule filter and stored at 4° C. until use.

Charge 1

| glycidoxypropyltrimethoxysilane | 32.4 grams |
| methyltrimethoxysilane | 345.5 grams |

Charge 2

| Solution of deionized water (DI) with nitric acid (nitric acid 1 g/7000 g) | 292 grams |

Charge 3

| DOWANOL ® PM solvent | 228 grams |

Charge 4

| TMAOH (25% tetramethylamonium hydroxide in methanol) | 0.45 grams |

Charge 5

| BYK ®-306 surfactant | 2.0 grams |

Part 3-6

Procedures Used for Preparing Coatings and Coating Stack Reported in Tables 1 & 2

Part 3-6A

Substrate Preparation

Square substrates measuring 5.08 cm by 5.08 cm by 0.318 cm (2 inches (in.) by 2 in. by 0.125 in.) prepared from CR-390 monomer were obtained from Homalite, Inc. Finished single vision lenses (6 base, 70 mm) prepared from CR-398 monomer were also used as indicated. Each substrate prepared from CR-39® monomer was cleaned by wiping with a tissue soaked with acetone and dried with a stream of air.

Finished single vision lenses (6 base, 70 mm) made of polycarbonate from GENTEX OPTICS and semi-finished single vision lenses (4 base, 70 mm) without a hardcoat made of TRIVEX monomer were also used as indicated. These lenses were cleaned by wiping with a tissue soaked with isopropanol and dried with a stream of air.

Each of the aforementioned substrates was corona treated by passing on a conveyor belt in Tantec EST Systems Serial No. 020270 Power Generator HV 2000 series corona treatment equipment with a high voltage transformer. The substrates were exposed to corona generated by 53.99 KV, 500 Watts while traveling on a conveyor at a belt speed 3 ft/min.

Part 3-6B

Coating Procedure for Primer

The primer solution was applied to the test substrates by spin-coating on a portion of the surface of the test substrate by dispensing approximately 1.5 mL of the solution and spinning the substrates at 500 revolutions per minute (rpm) for 3 seconds, followed by 1,500 rpm for 7 seconds, followed by 2,500 rpm for 4 seconds. A spin processor from Laurell Technologies Corp. (WS-400B-6NPP/LITE) was used for spin coating. Afterwards, the coated substrates were placed in an oven maintained at 125° C. for 60 minutes. The coated substrates were cooled to about 26° C. The substrate was corona treated by passing on a conveyor belt in Tantec EST Systems Serial No. 020270 Power Generator HV 2000 series corona treatment equipment with a high voltage transformer. The dried primer layer were exposed to corona generated by 53.00 KV, 500 Watts while traveling on a conveyor at a belt speed 3 ft/min.

Part 3-6C

Coating Procedure for Photoalignment Materials

The coating solutions of Examples 1 and 9 and CE prepared in Part 3-2 were applied to the test substrates by spin-coating on a portion of the surface of the test substrate by dispensing approximately 1.0 mL of the solution and spinning the substrates at 800 revolutions per minute (rpm) for 3 seconds, followed by 1,000 rpm for 7 seconds, followed by 4,000 rpm for 4 seconds. A spin processor from Laurell Technologies Corp. (WS-400B-6NPP/LITE) was used for spin coating. Afterwards, the coated substrates were placed in an oven maintained at 120° C. for 30 minutes. The coated substrates were cooled to about 26° C.

The dried photoalignment layer on each of the substrates was at least partially ordered by exposure to linearly polarized ultraviolet radiation using a DYMAX® UVC-6 UV/conveyor system by DYMAX® Corp. having a 400 Watt power supply. The light source was oriented such that the radiation was linearly polarized in a plane perpendicular to the surface of the substrate. The amount of ultraviolet radiation that each photoalignment layer was exposed to was measured using a UV Power Puck™ High energy radiometer from EIT Inc (Serial No. 2066) and was as follows: UVA 0.126 W/cm$^2$ and 5.962 J/cm$^2$; UVB 0.017 W/cm$^2$ and 0.078 J/cm$^2$; UVC 0 W/cm$^2$ and 0 J/cm$^2$; and UVV 0.046 W/cm$^2$ and 2.150 J/cm$^2$. After ordering at least a portion of the photo-orientable polymer network, the substrates were cooled to about 26° C. and kept covered.

Part 3-6D

Coating Procedure for Liquid Crystal Coating Formulations

The Liquid Crystal Coating Formulations ("LCCF") reported in Table 1 were each spin coated at a rate of 1,200 rpm/15 seconds onto the at least partially ordered photoalignment materials of Part 3-6C on the test substrates. Each coated square substrate was placed in an oven at 50° C. for 20 minutes and each coated lens was placed in an oven at 50° C. for 30 minutes. Afterwards substrates and lenses were cured under an ultraviolet lamp in the Irradiation Chamber BS-03 from Dr. Gröbel UV-Elektronik GmbH in a nitrogen atmosphere for 30 minutes at a peak intensity of 11-16 Watts/m$^2$ of UVA. Post curing of the coated substrates was completed at 110° C. for 3 hours.

The Liquid Crystal Coating Formulations ("LCCF") reported in Table 2 were each spin coated at a rate of 400 revolutions per minute (rpm) for 6 seconds, followed by 800 rpm for 6 seconds onto the at least partially ordered photoalignment materials of Part 3-6C on the test substrates. Each coated lens was placed in an oven at 60° C. for 30 minutes. Afterwards the lenses were cured under two ultraviolet lamps in the UV Curing Oven Machine designed and built by Belcan Engineering in nitrogen atmosphere while running on a conveyor belt at 6 ft/min speed at peak intensity of 0.445 Watts/cm$^2$ of UVA and 0.179 Watts/cm$^2$ of UVV and UV dosage of 2.753 Joules/cm$^2$ of UVA and 1.191 Joules/cm$^2$ of UVV. The cured layer were exposed to corona generated by 53.00 KV, 500 Watts while traveling on a conveyor at a belt speed 3 ft/min.

Part 3-6E

Coating Procedure for Transitional Layer

The Transitional layer solution prepared in Part 3-4 was spin coated at a rate of 1,400 revolutions per minute (rpm) for 7 seconds onto the cured LCCF coated substrates. Afterwards the lenses were cured under two ultraviolet lamps in the UV Curing Oven Machine designed and built by Belcan Engineering in nitrogen atmosphere while running on a conveyor belt at 6 ft/min speed at peak intensity of 1.887 Watts/cm$^2$ of UVA and 0.694 Watts/cm$^2$ of UVV and UV dosage of 4.699 Joules/cm$^2$ of UVA and 1.787 Joules/cm$^2$ of UVV. The cured tie layer were exposed to corona generated by 53.00 KV, 500 Watts while traveling on a conveyor at a belt speed 3 ft/min.

Part 3-6F

Coating Procedure for the Protective Coating (Hard Coat)

The hard coat solution prepared in Part 3-5 was spin coated at a rate of 2,000 revolutions per minute (rpm) for 10 seconds onto the cured tie layer coated substrates. Post curing of the coated substrates was completed at 105° C. for 3 hours.

Part 4

Adhesion Testing and Results

ASTM D-3359-93 Standard Test Method for Measuring Adhesion by Tape Test—Method B was used to determine adhesion of the layers onto the test substrate surfaces. The coated substrates were cut with 11 blades in a cross-hatch pattern to form about 200 squares. A tape pull was done 3 times on the same area using 3M #600 clear tape. Examination of the test surfaces was done with a STEREOMASTER II microscope from Fisher Scientific at 3× magnification. Results indicated as PASSED showed that a majority (i.e., greater than 75%) if not all squares remained on the surface of the substrate and FAILED results showed that a majority (i.e., greater than 75%) if not all squares were removed from the substrate by the tape. The results from the adhesion tests on the substrates indicated are presented in Tables 1 and 2. When the photoalignment materials of Examples 1-9 and the Comparative Example were used alone on a substrate (i.e., without an LCCF), the indication in the LCCF # column was "None Present" since the Liquid Crystal Coating Formulation was not applied. When the LCCF was applied to the layer of photoalignment material of Examples 1-9 and the Comparative Example, the respective number of each of the LCCFs applied and tested individually was indicated in Table 1. Table 2 includes the adhesion test results for polycarbonate lenses having a stack of the coatings indicated, i.e., the letter "X" means that the coating was present.

TABLE 1

Adhesion Test Results on Different Substrates

| Example # | LCCF # | Squares of CR-39 ® monomer | Lenses of CR-39 ® monomer | Lenses of Polycarbonate | Lenses of TRIVEX ® monomer |
|---|---|---|---|---|---|
| CE | None Present | FAILED | FAILED | FAILED | FAILED |
| CE | 1, 2, 3, 4, 5, 6 or 7 | FAILED | — | — | — |
| 1 | None Present | PASSED | PASSED | PASSED | PASSED |
| 1 | 1, 2, 3, 4, 5, 6 or 7 | PASSED | PASSED | — | — |
| 2 | None Present | PASSED | PASSED | PASSED | PASSED |
| 2 | 6 or 7 | PASSED | PASSED | PASSED | PASSED |
| 3 | None Present | PASSED | PASSED | — | — |
| 4 | None Present | PASSED | PASSED | PASSED | — |
| 5 | None Present | PASSED | — | PASSED | — |
| 6 | None Present | PASSED | — | PASSED | — |
| 7 | None Present | PASSED | — | PASSED | PASSED |
| 8 | None Present | PASSED | — | PASSED | PASSED |
| 9 | None Present | — | PASSED | — | — |
| 9 | 7 | — | PASSED | — | — |

TABLE 2

Adhesion Results for Coating Stacks on Polycarbonate Lenses

| Example # | Primer | Alignment Layer | LCCF | Tie Layer | Hard Coat | Adhesion |
|---|---|---|---|---|---|---|
| 1 | X | X | 6 | X | X | PASSED |
| 1 | X | X | 7 | X | X | PASSED |
| 9 | X | X | 7 | X | X | PASSED |
| CE | X | X | 6 | X | X | FAILED |
| CE | X | X | 7 | X | X | FAILED |

It is to be understood that the present description and examples illustrates aspects of the invention relevant to a clear understanding of the invention. Certain aspects of the invention that would be apparent to those of ordinary skill in the art and that, therefore, would not facilitate a better understanding of the invention have not been presented in order to simplify the present description. Although the present invention has been described in connection with certain embodiments, the present disclosure is not limited to the particular embodiments or examples disclosed herein, but is intended to cover modifications that are within the spirit and scope of the invention, as defined by the appended claims.

We claim:
1. A (co)polymer comprising:
a structure represented by the formula:

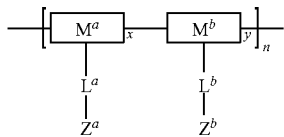

where:
each $M^a$ and $M^b$ is independently a residue of monomeric units of substituted or unsubstituted acryloyl units, wherein said acryloyl substituents are selected from the group consisting of $C_1$-$C_4$ alkyl, phenyl, —O— and combinations thereof, substituted or unsubstituted styrene units, substituted or unsubstituted epoxy units, substituted or unsubstituted urethane units, substituted or unsubstituted polycarboxylic acid units, substituted or unsubstituted polyol units, substituted or unsubstituted polyamine units, and substituted or unsubstituted hydroxyalkanoic acid units; wherein said substituents are selected from the group consisting of $C_1$-$C_{20}$ alkyl, $C_1$-$C_{20}$ alkoxy, $C_3$-$C_{10}$ cycloalkyl, $C_1$-$C_{20}$ alkyl($C_1$-$C_{20}$)alkoxy, halo($C_1$-$C_{20}$)alkyl, heterocyclo($C_3$-$C_{10}$)alkyl, haloaryl, halo($C_1$-$C_{20}$)alkylaryl, $C_1$-$C_{20}$ alkylaryl, $C_1$-$C_{20}$ alkoxyaryl, aryl($C_1$-$C_{20}$)alkyl, heteroaryl ($C_1$-$C_{20}$)alkyl, and combinations thereof;
$L^a$ and $L^b$ are spacer groups that are each independently selected from the group consisting of a single bond, —$(CH_2)_g$—, —$(CF_2)_h$—, —$Si(Z')_2(CH_2)_g$—, —$(Si(CH_3)_2O)_h$—, —$N(R)$—, —$C(R)$=$C(R)$—, —$C(R)$=$N$—, —$C(R')_2$—$C(R')_2$—, —O—, —$C(O)$—, —C≡C—, —N=N—, —S—, —S(O)—, —S(O)(O)—, —(O)S(O)O—, —O(O)S(O)O—, straight-chain or branched $C_1$-$C_{24}$ alkylene residue, arylene, $C_3$-$C_{10}$ cycloalkylene, or various and various combinations thereof, wherein Z' is independently, for each occurrence, hydrogen, $C_1$-$C_{18}$ alkyl, $C_3$-$C_{10}$ cycloalkyl or aryl; R is independently, for each occurrence, $Z^b$, hydrogen, $C_1$-$C_{18}$ alkyl, $C_3$-$C_{10}$ cycloalkyl or aryl; R' is independently, for each occurrence, $Z^b$, $C_1$-$C_{18}$ alkyl, $C_3$-$C_{10}$ cycloalkyl or aryl; the $C_1$-$C_{24}$ alkylene residue is mono-substituted by $Z^b$, cyano, or halo, or poly-substituted by $Z^b$ or halo; "g" is independently, for each occurrence, from 1 to 20; and "h" is a whole number from 1 to 16 inclusive;

each $Z^a$ is independently a photochemically active chromophore selected from the group consisting of a dimerizable substituted or unsubstituted cinnamate, a dimerizable substituted or unsubstituted coumarin, a cis/trans isomerizable substituted or unsubstituted azo, and a substituted or unsubstituted aromatic ester capable of undergoing a Photo-Fries rearrangement; wherein said substituents are selected from the group consisting of $C_1$-$C_{20}$ alkyl, $C_2$-$C_{20}$ alkenyl, $C_2$-$C_{20}$ alkynyl, $C_1$-$C_{20}$ alkoxy, $C_1$-$C_{20}$ alkyl($C_1$-$C_{20}$)alkoxy, $C_1$-$C_{20}$ alkoxy($C_1$-$C_{20}$)alkyl, aryl, heteroaryl, $C_1$-$C_{20}$ alkylamino, di($C_1$-$C_{20}$)alkyl amino, halogen, halo($C_1$-$C_{20}$)alkyl, $C_3$-$C_{10}$ cycloalkyl, heterocyclo($C_3$-$C_{10}$) alkyl, carboxy, $C_1$-$C_{20}$ alkylcarbonyl, $C_1$-$C_{20}$ alkoxycarbonyl, aminocarbonyl, and combinations thereof;

each $Z^b$ is an adhesion promoter group independently selected from the group consisting of anhydride, isocyanato, blocked isocyanato, thioisocyanato, blocked thioisocyanato, organofunctional silane, organofunctional titanate, organofunctional zirconate, and epoxy; wherein each organofunctional group is independently selected from the group consisting of vinyl, allyl, vinyl-functional hydrocarbon radicals, allyl-functional hydrocarbon radicals, acryloyl-functional hydrocarbon radicals, methacryloyl-functional hydrocarbon radicals, styryl-functional hydrocarbon radicals, mercapto-functional hydrocarbon radicals or radicals, and combinations of such organofunctional groups, said hydrocarbon radicals being selected from the group consisting of $C_1$-$C_{20}$ alkyl, $C_2$-$C_{20}$ alkenyl, $C_2$-$C_{20}$ alkynyl, $C_1$-$C_{20}$ alkoxy, $C_1$-$C_{20}$ alkyl($C_1$-$C_{20}$)alkoxy, $C_1$-$C_{20}$ alkoxy($C_1$-$C_{20}$)alkyl, aryl, heteroaryl, and combinations of such hydrocarbon radicals; and "x" has a value of 0<x≤1, and "y" has a value of 0≤y<1, where x+y=1 and "n" has a value ranging from 10 to 10,000, wherein when x=1, then at least one of $L^a$ and $Z^a$ is further substituted with at least one $Z^b$ adhesion promoter group, and wherein said co-polymer further comprises a residue of at least one of a photochromic compound, a dichroic compound, a photochromic-dichroic compound, and a photosensitive material.

2. The (co)polymer of claim 1, wherein the (co)polymer is in the form of a random copolymer, a block copolymer, a graft copolymer, a linear copolymer, a branched copolymer, a hyperbranched copolymer, a dendritic copolymer, or a star copolymer.

3. The (co)polymer of claim 1, wherein each $M^a$ and $M^b$ is independently a residue of substituted or unsubstituted acryloyloxy units or substituted or unsubstituted methacryloyloxy units, and $Z^a$ is a photochemically active chromophore selected from the group consisting of a dimerizable substituted or unsubstituted cinnamate, and a dimerizable substituted or unsubstituted coumarin.

4. The (co)polymer of claim 1, wherein the copolymer structure further comprises a residue of a substituted monomeric unit $M^c$ having the structure:

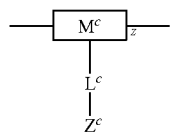

where
- each $M^c$ is independently a residue of a monomeric unit selected from substituted or unsubstituted acryloyl units, wherein said acryloyl substituents are chosen selected from the group consisting of $C_1$-$C_4$ alkyl, phenyl, —O— and combinations thereof, substituted or unsubstituted styrene units, substituted or unsubstituted epoxy units, substituted or unsubstituted urethane units, substituted or unsubstituted polycarboxylic acid units, substituted or unsubstituted polyol units, substituted or unsubstituted polyamine units, and substituted or unsubstituted hydroxyalkanoic acid units; wherein said substituents are selected from the group consisting of $C_1$-$C_{20}$ alkyl, $C_1$-$C_{20}$ alkoxy, $C_3$-$C_{10}$ cycloalkyl, $C_1$-$C_{20}$ alkyl($C_1$-$C_{20}$)alkoxy, halo($C_1$-$C_{20}$)alkyl, heterocyclo($C_3$-$C_{10}$)alkyl, haloaryl, halo($C_1$-$C_{20}$)alkylaryl, $C_1$-$C_{20}$ alkylaryl, $C_1$-$C_{20}$ alkoxyaryl, heteroaryl, aryl($C_1$-$C_{20}$)alkyl, heteroaryl($C_1$-$C_{20}$)alkyl, and combinations thereof;
- each $L^c$ is a spacer group that is independently a single bond, —$(CH_2)_g$—, —$(CF_2)_h$—, —$Si(Z')_2(CH_2)_g$—, or —$(Si(CH_3)_2O)_h$—, —N(R)—, —C(R)=C(R)—, —C(R)=N—, —C(R')_2—C(R')_2—, —O—, —C(O)—, —C≡C—, —N=N—, —S—, —S(O)—, —S(O)(O)—, —(O)S(O)O—, —O(O)S(O)O—, straight-chain or branched $C_1$-$C_{24}$ alkylene residue, arylene, $C_3$-$C_{10}$ cycloalkylene, or various combinations thereof;
- $Z^c$ is a mesogen structure selected from the group consisting of a rigid straight rod-like liquid crystal group, a rigid bent rod-like liquid crystal group, and a rigid disc-like liquid crystal group; and
- "z" has a value of 0<z<1 where x+y+z=1, wherein when y=0, then at least one of $L^a$, $Z^a$, $L^c$ and $Z^c$ is further substituted with at least one $Z^b$ adhesion promoter group.

5. A (co)polymer comprising:
a structure represented by the formula:

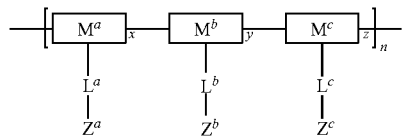

where:
- each $M^a$, $M^b$, and $M^c$ is independently a residue of a monomeric unit selected from the group consisting of substituted or unsubstituted acryloyl units, wherein said acryloyl substituents are selected from the group consisting of $C_1$-$C_4$ alkyl, phenyl, —O— and combinations thereof, substituted or unsubstituted styrene units, substituted or unsubstituted epoxy units, substituted or unsubstituted urethane units, substituted or unsubstituted polycarboxylic acid, substituted or unsubstituted polyol units, substituted or unsubstituted polyamine units, and substituted or unsubstituted hydroxyalkanoic acid units; wherein said substituents are selected from the group consisting of $C_1$-$C_{20}$ alkyl, $C_1$-$C_{20}$ alkoxy, $C_3$-$C_{10}$ cycloalkyl, $C_1$-$C_{20}$ alkyl($C_1$-$C_{20}$)alkoxy, halo($C_1$-$C_{20}$)alkyl, heterocyclo($C_3$-$C_{10}$)alkyl, haloaryl, halo($C_1$-$C_{20}$)alkylaryl, $C_1$-$C_{20}$ alkylaryl, $C_1$-$C_{20}$ alkoxyaryl, heteroaryl, aryl($C_1$-$C_{20}$)alkyl, heteroaryl($C_1$-$C_{20}$)alkyl, and combinations thereof;
- $L^a$, $L^b$, and $L^c$ are spacer groups that are each independently a single bond, —$(CH_2)_g$—, —$(CF_2)_h$—, —$Si(Z')_2(CH_2)_g$—, —$(Si(CH_3)_2O)_h$—, —N(R)—, —C(R)=C(R)—, —C(R)=N—, —C(R')_2—C(R')_2—, —O—, —C(O)—, —C≡C—, —N=N—, —S—, —S(O)—, —S(O)(O)—, —(O)S(O)O—, —O(O)S(O)O—, straight-chain or branched $C_1$-$C_{24}$ alkylene residue, arylene, $C_3$-$C_{10}$ cycloalkylene, and various combinations thereof, wherein $Z'$ is independently, for each occurrence, hydrogen, $C_1$-$C_{18}$ alkyl, $C_3$-$C_{10}$ cycloalkyl or aryl; R is independently, for each occurrence, $Z^b$, hydrogen, $C_1$-$C_{18}$ alkyl, $C_3$-$C_{10}$ cycloalkyl or aryl; R' is independently, for each occurrence, $Z^b$, $C_1$-$C_{18}$ alkyl, $C_3$-$C_{10}$ cycloalkyl or aryl; the $C_1$-$C_{24}$ alkylene residue is mono-substituted by $Z^b$, cyano, or halo, or poly-substituted by $Z^b$ or halo; "g" is independently, for each occurrence, from 1 to 20; and "h" is a whole number from 1 to 16 inclusive;
- each $Z^a$ is independently a photochemically active chromophore selected from the group consisting of a dimerizable substituted or unsubstituted cinnamate, a dimerizable substituted or unsubstituted coumarin, a cis/trans isomerizable substituted or unsubstituted azo, and substituted or unsubstituted aromatic ester capable of undergoing a Photo-Fries rearrangement;
- each $Z^b$ is an adhesion promoter group independently selected from the group consisting of anhydride, isocyanato, blocked isocyanato, thioisocyanato, blocked thioisocyanato, organofunctional silane, organofunctional titanate, or organofunctional zirconate, wherein each organofunctional group is independently selected from the group consisting of vinyl, allyl, vinyl-functional hydrocarbon radicals, allyl-functional hydrocarbon radicals, acryloyl-functional hydrocarbon radicals, methacryloyl-functional hydrocarbon radicals, styryl-functional hydrocarbon radicals, mercapto-functional hydrocarbon radicals, and combinations of such organofunctional groups, said hydrocarbon radicals being selected from the group consisting of $C_1$-$C_{20}$ alkyl, $C_2$-$C_{20}$ alkenyl, $C_2$-$C_{20}$ alkynyl, $C_1$-$C_{20}$ alkoxy, $C_1$-$C_{20}$ alkyl($C_1$-$C_{20}$)alkoxy, $C_1$-$C_{20}$ alkoxy($C_1$-$C_{20}$)alkyl, aryl, heteroaryl, and combinations of such hydrocarbon radicals;
- $Z^c$ is a mesogen structure selected from the group consisting of a rigid straight rod-like liquid crystal group, a rigid bent rod-like liquid crystal group, and a rigid disc-like liquid crystal group; and
- "x" has a value of 0<x≤1, "y" has a value of 0≤y<1, and "z" has a value of 0≤z<1 where x+y+z=1 and "n" has a value ranging from 10 to 10,000,
- wherein when x=1, then at least one of $L^a$ and $Z^a$ is further substituted with at least one $Z^b$ adhesion promoter group and when y=0, then at least one of $L^a$, $Z^a$, $L^c$ and $Z^c$ is further substituted with at least one $Z^b$ adhesion promoter group, and wherein said (co)polymer further comprises a residue of at least one of a photochromic compound, a dichroic compound, a photochromic-dichroic compound, and a photosensitive material.

6. The (co)polymer of claim 5, wherein the (co)polymer is in the form of a random copolymer, a block copolymer, a graft copolymer, a linear copolymer, a branched copolymer, a hyperbranched copolymer, a dendritic copolymer, or a star copolymer.

7. The (co)polymer of claim 5, wherein the $Z^c$ mesogen structure has a structure represented by:

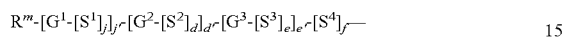

where:
(i) each $G^1$, $G^2$, and $G^3$ is independently, for each occurrence, a divalent group from the group consisting of an unsubstituted or a substituted aromatic group, an unsubstituted or a substituted alicyclic group, an unsubstituted or a substituted heterocyclic group, and mixtures thereof, wherein substituents are from the group consisting of hydroxyl; halogen; $C_2$-$C_{18}$ alkenyl; $C_2$-$C_{18}$ alkynyl; azido; silyl; siloxy; silylhydride; (tetrahydro-2H-pyran-2-yl)oxy; thio; isocyanato; thioisocyanato; acryloyloxy; methacryloyloxy; 2-(acryloyloxy)ethylcarbamyl; 2-(methacryloyloxy)ethylcarbamyl; aziridinyl; allyloxycarbonyloxy; epoxy; carboxylic acid; carboxylic ester; acryloylamino; methacryloylamino; aminocarbonyl; $C_1$-$C_{18}$ alkyl aminocarbonyl; aminocarbonyl($C_1$-$C_{18}$)alkyl; $C_1$-$C_{18}$ alkoxycarbonyl; $C_1$-$C_{18}$ alkylcarbonyl; aryloxycarbonyloxy; perfluoro($C_1$-$C_{18}$)alkylamino; di-(perfluoro($C_1$-$C_{18}$)alkyl)amino; $C_1$-$C_{18}$ acetyl; $C_3$-$C_{10}$ cycloalkyl; $C_3$-$C_{10}$ cycloalkoxy; $C_1$-$C_{18}$ alkyloxycarbonyloxy; halocarbonyl; hydrogen; aryl; hydroxy($C_1$-$C_{18}$)alkyl; $C_1$-$C_{18}$ alkyl; $C_1$-$C_{18}$ alkoxy; amino($C_1$-$C_{18}$)alkyl; $C_1$-$C_{18}$ alkylamino; di-($C_1$-$C_{18}$)alkylamino; $C_1$-$C_{18}$ alkyl($C_1$-$C_{18}$)alkoxy; $C_1$-$C_{18}$ alkoxy($C_1$-$C_{18}$)alkoxy; nitro; poly($C_1$-$C_{18}$)alkyl ether; ($C_1$-$C_{18}$)alkyl($C_1$-$C_{18}$)alkoxy($C_1$-$C_{18}$)alkyl; poly($C_1$-$C_{18}$)alkoxy; ethylene; acryloyloxy($C_1$-$C_{18}$)alkyl; methacryloxyloxy($C_1$-$C_{18}$)alkyl; 2-chloroacryloyloxy; 2-phenylacryloyloxy; acryloyloxyphenyl; 2-chloroacryloylamino; 2-phenylacryloylaminocarbonyl; oxetanyl; glycidyl; cyano; isocyanato($C_1$-$C_{18}$)alkyl; itaconic acid ester; vinyl ether; vinyl ester; styrene derivative; main-chain or side-chain liquid crystal polymers; siloxane derivatives; ethyleneimine derivatives; maleic acid derivatives; fumaric acid derivatives; a straight-chain or branched $C_1$-$C_{18}$ alkyl group that is mono-substituted with cyano, halo, or $C_1$-$C_{18}$ alkoxy, or poly-substituted with halo; unsubstituted cinnamic acid derivatives; cinnamic acid derivatives that are substituted with at least one of methyl, methoxy, cyano, or halogen; substituted or unsubstituted chiral or non-chiral monovalent or divalent groups chosen from steroid radicals, terpenoid radicals, alkaloid radicals, and mixtures thereof, wherein the substituents are independently chosen from the group consisting of $C_1$-$C_{18}$ alkyl, $C_1$-$C_{18}$ alkoxy, $C_3$-$C_{10}$ cycloalkyl, $C_1$-$C_{18}$ alkyl($C_1$-$C_{18}$)alkoxy, fluoro($C_1$-$C_{18}$)alkyl, cyano, cyano($C_1$-$C_{18}$)alkyl, cyano($C_1$-$C_{18}$)alkoxy, and mixtures thereof; or a group comprising one of the following formulae: -M(T)$_{(t-1)}$ and -M(OT)$_{(t-1)}$, wherein M is selected from the group consisting of aluminum, antimony, tantalum, titanium, zirconium and silicon, T is selected from the group consisting of organofunctional radicals, organofunctional hydrocarbon radicals, aliphatic hydrocarbon radicals and aromatic hydrocarbon radicals, and "t" is the valence of M;

(ii) $R^m$ is —H; hydroxy; halogen; haloalkyl; aryl; $C_1$-$C_{18}$ alkyl; or $C_1$-$C_{18}$ alkoxy;

(iii) "j", "d", "e", and "f" are each independently an integer ranging from 0 to 20, inclusive; "j'", "d'" and "e'" are each independently an integer from 0 to 4 provided that a sum of j'+d'+e' is at least 1; and (iv) each $S^1$, $S^2$, $S^3$, and $S^4$ is independently, for each occurrence, a spacer unit selected from the group consisting of:

(A) —(CH$_2$)$_g$—, —(CF$_2$)$_h$—, —Si(Z')$_2$(CH$_2$)$_g$—, or —(Si(CH$_3$)$_2$O)$_h$—, wherein Z' is independently, for each occurrence, hydrogen, $C_1$-$C_{18}$ alkyl, $C_3$-$C_{10}$ cycloalkyl or aryl; "g" is independently, for each occurrence, from 1 to 20 and "h" is a whole number from 1 to 16 inclusive;

(B) —N(Y)—, —C(Y)=C(Y)—, —C(Y)=N—, —C(Y')$_2$—C(Y')$_2$—, or a single bond, wherein Y is independently, for each occurrence, hydrogen, $C_1$-$C_{18}$ alkyl, $C_3$-$C_{10}$ cycloalkyl or aryl, and Y' is independently, for each occurrence, $C_1$-$C_{18}$ alkyl, $C_3$-$C_{10}$ cycloalkyl or aryl; or (C) —O—, —C(O)—, —C≡C—, —N=N—, —S—, —S(O)—, —S(O)(O)—, —(O)S(O)O—, —O(O)S(O)O— or straight-chain or branched $C_1$-$C_{24}$ alkylene residue, said $C_1$-$C_{24}$ alkylene residue being unsubstituted, mono-substituted by cyano or halo, or poly-substituted by halo;

provided that when two spacer units comprising heteroatoms are linked together, the spacer units are linked so that heteroatoms are not directly linked to each other, and when $S^1$ and $S^4$ are linked to another group, they are linked so that two heteroatoms are not directly linked to each other.

8. The (co)polymer of claim 5, wherein each $M^a$, $M^b$, and $M^c$ is independently a residue of substituted or unsubstituted acryloyloxy units or substituted or unsubstituted methacryloyloxy units, and $Z^a$ is a photochemically active chromophore selected from the group consisting of a dimerizable substituted or unsubstituted cinnamate, and a dimerizable substituted or unsubstituted coumarin.

9. A composition of the (co)polymer of claim 5, further comprising one or more additives, wherein the one of more additives are selected from the group consisting of a photochromic compound, a dichroic compound, a photochromic-dichroic compound, a photosensitive material, a liquid crystal, a liquid crystal property control additive, a non-linear optical material, a dye, an alignment promoter, a kinetic enhancer, a photoinitiator, a thermal initiator, a surfactant, a polymerization inhibitor, a solvent, a light stabilizer, a thermal stabilizer, a mold release agent, a rheology control agent, a gelator, a leveling agent, a free radical scavenger, a coupling agent, a tilt control additive, a block or non-block polymeric material, and an adhesion promoter.

* * * * *

UNITED STATES PATENT AND TRADEMARK OFFICE
CERTIFICATE OF CORRECTION

PATENT NO. : 9,475,901 B2  
APPLICATION NO. : 12/959467  
DATED : October 25, 2016  
INVENTOR(S) : Gobinda Saha et al.

Page 1 of 1

It is certified that error appears in the above-identified patent and that said Letters Patent is hereby corrected as shown below:

In the Claims

Column 44, Line 37, Claim 1, after "hydrocarbon" delete "radicals or"

Column 47, Line 43, Claim 7, delete "methacryloxyloxy" and insert -- methacryloyloxy --

Signed and Sealed this  
Thirteenth Day of March, 2018

Andrei Iancu  
*Director of the United States Patent and Trademark Office*